(12) United States Patent
Yang et al.

(10) Patent No.: US 12,546,660 B2
(45) Date of Patent: Feb. 10, 2026

(54) OPTICAL WHISPERING GALLERY MODE BARCODES FOR HIGH-PRECISION AND WIDE-RANGE MEASUREMENTS

(71) Applicant: Washington University, St. Louis, MO (US)

(72) Inventors: Lan Yang, St. Louis, MO (US); Jie Liao, St. Louis, MO (US)

(73) Assignee: Washington University, St. Louis, MO (US)

( * ) Notice: Subject to any disclaimer, the term of this patent is extended or adjusted under 35 U.S.C. 154(b) by 632 days.

(21) Appl. No.: 17/859,879

(22) Filed: Jul. 7, 2022

(65) Prior Publication Data

US 2023/0010794 A1    Jan. 12, 2023

Related U.S. Application Data

(60) Provisional application No. 63/218,948, filed on Jul. 7, 2021.

(51) Int. Cl.
  *G01J 5/44* (2006.01)
  *G01J 5/0821* (2022.01)
  *G06K 19/06* (2006.01)

(52) U.S. Cl.
  CPC ............ *G01J 5/44* (2013.01); *G01J 5/0821* (2013.01); *G06K 19/06028* (2013.01)

(58) Field of Classification Search
  CPC .......... G01J 5/44; G01J 5/0821; G01J 3/0218; G01J 2003/2873; G01J 3/26; G06K 19/06028; G01K 11/3206; G02B 6/29341
  See application file for complete search history.

(56) References Cited

U.S. PATENT DOCUMENTS

| | | | |
|---|---|---|---|
| 7,085,452 B1 * | 8/2006 | Lin | G02B 6/4215 374/E11.015 |
| 9,238,152 B2 | 1/2016 | Coussios et al. | |
| 10,575,816 B2 | 3/2020 | Prus et al. | |

(Continued)

FOREIGN PATENT DOCUMENTS

| | | |
|---|---|---|
| CN | 103091340 A | 5/2013 |
| CN | 104076205 B | 7/2017 |

(Continued)

OTHER PUBLICATIONS

CN-110906981-A PE2E translation (Year: 2020).*

(Continued)

*Primary Examiner* — Kara E. Geisel
*Assistant Examiner* — Maya Hendija

(57) ABSTRACT

Systems and methods for measuring a temperature using an optical whispering gallery mode (WGM) resonator are disclosed. The system includes a WGM resonator operatively coupled to a tunable laser source and a detector, as well as a computing device. The computing device is configured to transform a transmission spectrum from the detector into a measured barcode that includes a matrix of values indicative of at least one characteristic of the transmission spectrum. The computing device is further configured to transform the measured barcode into a temperature based on a relative collective shift of the measured barcode from a reference barcode selected from a predetermined library of reference barcodes.

15 Claims, 15 Drawing Sheets

(56) References Cited

U.S. PATENT DOCUMENTS

| | | | |
|---|---|---|---|
| 10,578,594 B2 | 3/2020 | Tadigadapa et al. | |
| 10,782,289 B2 | 9/2020 | Ozdemir et al. | |
| 2007/0109550 A1* | 5/2007 | Ja | G01J 3/26 |
| | | | 356/480 |
| 2018/0206816 A1 | 7/2018 | Prus et al. | |
| 2019/0175146 A1 | 6/2019 | Lafon et al. | |

FOREIGN PATENT DOCUMENTS

| | | | | |
|---|---|---|---|---|
| CN | 107014522 B | | 5/2019 | |
| CN | 109855760 A | | 6/2019 | |
| CN | 110906981 A | * | 3/2020 | ............ G01D 21/02 |
| WO | WO-2018001942 A1 | * | 1/2018 | ............ G01N 21/31 |
| WO | WO-2021055823 A2 | * | 3/2021 | ........... A61B 5/0095 |
| WO | WO-2021119182 A1 | * | 6/2021 | ............... G01H 9/00 |

OTHER PUBLICATIONS

Lafond et al., Evaluation of a Three-Hydrophone Method for 2-D Cavitation Localization, IEEE Transactions on Ultrasonics, Ferroelectrics, and Frequency Control, Jul. 2018, pp. 1093-1101, vol. 65, No. 7.

Foroozan et al., Microbubble Localization for Three-Dimensional Superresolution Ultrasound Imaging Using Curve Fitting and Deconvolution Methods, IEEE Transactions on Biomedical Engineering, Dec. 2018, pp. 2692-2703, vol. 65, No. 12.

Cheng et al., Robust and Low-Complexity Time-Reversal Subspace Decomposition Methods for Acoustic Emission Imaging and Localization, IEEE Sensors Journal, Sep. 2020, pp. 3486-3496, vol. 21, No. 3.

Jones et al., Three-dimensional transcranial microbubble imaging for guiding volumetric ultrasound-mediated blood-brain barrier opening, Theranostics, Apr. 2018, pp. 2909-2926, vol. 8, No. 16.

Hu et al., 3-D Transcranial Microbubble Cavitation Localization by Four Sensors, IEEE Transactions on Ultrasonics, Ferroelectrics, and Frequency Control, Nov. 2021, pp. 3336-3346, vol. 68, No. 11.

Lu et al., Passive cavitation mapping using dual apodization with cross-correlation in ultrasound therapy monitoring, Ultrasonics Sonochemistry, 2019, pp. 18-31, vol. 54.

\* cited by examiner (c)

OPTICAL WHISPERING GALLERY MODE BARCODES FOR HIGH-PRECISION AND WIDE-RANGE MEASUREMENTS

CROSS-REFERENCE TO RELATED APPLICATIONS

This application claims priority from U.S. Provisional Application Ser. No. 63/218,948 filed on Jul. 7, 2021, which is incorporated herein by reference in its entirety.

STATEMENT REGARDING FEDERALLY SPONSORED RESEARCH OR DEVELOPMENT

Not applicable.

MATERIAL INCORPORATED-BY-REFERENCE

Not applicable.

FIELD OF THE INVENTION

The present disclosure generally relates to devices, systems, and methods for high-precision and wide-range measurements using optical whispering gallery mode (WGM) resonator sensors.

BACKGROUND OF THE INVENTION

As a fundamental physical parameter, temperature plays an important role in many physical, chemical, and biological systems. Precise thermal sensing has thus become of great interest in many scientific, engineering, and industrial areas, such as novel materials, energy harvesting, biomedical studies, healthcare treatment, and environmental monitoring. For instance, precise and continuous monitoring of temperature changes in the human body is critical in understanding the thermal phenomenon of homeostasis and providing essential diagnostic information to identify appropriate treatment protocols for diseases such as COVID-19, traumatic brain injury, and cancer. Another example is temperature sensors on artificial intelligence robots, which help robots detect environmental temperature. Through synchronous motility and sensory perception, robots can adapt to changing environments by actively responding to temperature and other stimuli.

To meet these increasing demands, numerous technologies and devices for thermal sensing have been developed; however, most of them are not capable of measuring the temperature with high sensitivity and a large dynamic range in different environments. Conventional thermometers are not able to measure small temperature fluctuations, especially on the submicron scale, such as in microcircuits and intracellular liquids. Among various conventional thermal-sensing systems, optical sensing technologies are finding increasing interest and applications due to their selectivity, immunity to electromagnetic interference, and the capability for multiplexing and remote sensing. For the past few decades, various optical structures, such as waveguides, photonic crystal fibers, and Sagnac interferometers, have been developed for thermal sensing. However, accurate temperature sensing with high resolution based on single-pass (waveguide or fiber) optical sensors is challenging due to the limited optical sensing path. In those sensors, light interacts with the sensing material only once; consequently, thermal sensitivity and response are generally limited by the dimension of the sensor.

An optical resonator is a promising candidate as a solution to overcome the aforementioned limitations. Light could circulate in a high-quality resonator million of times, thereby significantly enhancing the light-matter interactions and consequently improving the sensitivity. In addition, the high quality factor (Q factor) of a resonator leads to a narrow bandwidth in the spectrum, making it easier to resolve subtle changes when tracking the resonant wavelengths, which consequently improves the detection limit. Among various kinds of optical resonator sensors, whispering gallery mode (WGM) resonators have attracted increasing attention due to their exceptionally high quality factors. Various WGM resonators have been demonstrated to measure the temperature in both laboratory and outdoor environments by tracking the changes in the resonant wavelength because the temperature dependence of the resonance arises from thermally induced changes in the refractive index and the physical dimensions of the resonator. This sensing method has been used for different thermal sensing applications.

However, despite its potential sensitivity and resolution, there are certain limitations in tracking the resonance of particular modes in sensing experiments. First, the actual temperature cannot be extracted from the WGM spectrum directly. In previous approaches, the relative shift of a resonant mode induced by a temperature change with respect to its original state (baseline) is monitored; therefore it is impossible to determine the absolute value of the temperature only from the WGM spectrum without knowing the initial temperature. Second, the dynamic range of the measurement is limited by the requirement to continuously scan the laser around the same mode that changes with temperature. The previous methods can no longer track the resonance if the mode shifts out of the scanning range. Although the measurement range can be improved by increasing the laser scanning range, the resolution will drop accordingly since the number of data points for each spectrum is limited. Consequently, there is an urgent need for optical sensor technologies that enable direct temperature measurement with both a large dynamic range and high resolution in a reliable way.

SUMMARY OF THE INVENTION

Among the various aspects of the present disclosure is the provision of systems and methods for measuring temperature using optical whispering gallery mode (WGM) resonators.

In one aspect, an optical thermal sensing system for measuring a temperature is disclosed that includes a WGM sensor that includes a WGM resonator operatively coupled to a tunable laser source and a detector. The optical thermal sensing system further includes a computing device with at least one processor and a non-volatile computer-readable memory. The computing device is configured to: receive a plurality of signals from the detector indicative of a transmission spectrum of the WGM resonator; transform the plurality of signals into a measured barcode; and transform the measured barcode into the temperature based on a relative collective shift of the measured barcode from a reference barcode selected from a predetermined library of reference barcodes. The measured barcode includes a matrix of values indicative of at least one characteristic of the transmission spectrum. Each reference barcode includes a matrix of reference values corresponding to one reference temperature. In some aspects, the WGM sensor further includes a taper fiber waveguide with opposed first and second ends operatively coupled to the tunable laser source and the detector, respectively, wherein the taper fiber waveguide is configured to couple light into and out of the WGM resonator. In some aspects, the WGM resonator and the taper fiber are encapsulated in a low refractive index adhesive. In some aspects, the WGM resonator supports a plurality of non-degenerate whispering gallery mode resonance modes. In some aspects, the WGM resonator is a microbubble resonator. In some aspects, the detector includes a photodetector coupled to the second end of the tapered fiber and configured to receive transmitted light energy; and an oscilloscope configured to transform a plurality of detector signals from the photodetector into the transmission spectrum.

In another aspect, a computer-aided method of measuring a temperature using the optical thermal sensing system described above is disclosed. The method includes producing a wavelength scan of laser light using the tunable laser source and directing the laser light into the first end of the taper fiber waveguide; receiving, using the detector, a transmission spectrum from the second end of the taper fiber waveguide; transforming, using the computing device, the transmission spectrum into a measured barcode; and transforming, using the computing device, the measured barcode into the temperature based on a relative collective shift of the measured barcode from a reference barcode selected from a predetermined library of reference barcodes. The transmission spectrum includes a non-resonant portion of the wavelength scan. The non-resonant portion of the wavelength scan includes those light wavelengths falling outside of at least one resonance mode of the WGM resonator. The measured barcode includes a matrix of values indicative of at least one characteristic of the transmission spectrum. Each reference barcode includes a matrix of reference values corresponding to one reference temperature. In some aspects, each value of the matrix of values indicative of at least one characteristic of the transmission spectrum in the measured and reference barcodes includes one of: a resonant wavelength, a mode spacing, a coupling depth, and a linewidth. In some aspects, the matrix of values indicative of at least one characteristic of the transmission spectrum in the measured and reference barcodes includes a one-dimensional array in which each element of the one-dimensional array corresponds to a rectangle of the barcode. Each rectangle is indicative of one mode of the transmission spectrum and includes a width indicative of the linewidth of one mode of the transmission spectrum and a color indicative of a coupling depth of the one mode. In some aspects, transforming the transmission spectrum into the measured barcode includes assigning a color to each rectangle of the barcode using a color map. In some aspects, the color map is a Parula color map. In some aspects, transforming the measured barcode into the temperature based on the relative collective shift of the measured barcode from a reference barcode selected from a predetermined library of reference barcodes further includes: comparing, using the computing device, the measured barcode to each reference barcode from the predetermined library and selecting a most similar reference barcode; calculating, using the computing device, the relative collective shift of the measured barcode from the most similar reference barcode; and calculating, using the computing device, the temperature by adjusting the reference temperature of the most similar reference barcode in proportion to the relative collective shift. In some aspects, each value of the matrix of values indicative of at least one characteristic of the transmission spectrum in the measured and reference barcodes includes one of: a resonant wavelength, a mode spacing, a coupling depth, and a linewidth.

In some aspects, the matrix of values indicative of at least one characteristic of the transmission spectrum in the measured and reference barcodes comprises a one-dimensional array, each element of the one-dimensional array corresponding to a rectangle of the barcode in which each rectangle is indicative of one mode of the transmission spectrum. Each rectangle includes a width indicative of the linewidth of one mode of the transmission spectrum and a color indicative of a coupling depth of the one mode. In some aspects, transforming the transmission spectrum into the measured barcode includes assigning a color to each rectangle of the barcode using a color map. In some aspects, the color map is a Parula color map. In some aspects, transforming the measured barcode into the temperature based on the relative collective shift of the measured barcode from a reference barcode selected from a predetermined library of reference barcodes further includes: comparing, using the computing device, the measured barcode to each reference barcode from the predetermined library and selecting a most similar reference barcode; calculating, using the computing device, the relative collective shift of the measured barcode from the most similar reference barcode; and calculating, using the computing device, the temperature by adjusting the reference temperature of the most similar reference barcode in proportion to the relative collective shift. In some aspects, comparing the measured barcode to each reference barcode and selecting a most similar reference barcode further includes calculating, using the computing device, a cross-correlation function for the measured barcode and each reference barcode; and selecting the reference barcode with the lowest relative collective shift. In some aspects, adjusting the reference temperature of the most similar reference barcode in proportion to the relative collective shift further comprises calculating, using the computing device, a temperature change relative to the selected reference barcode by converting the relative collective shift to a temperature shift relative to the corresponding temperature of the selected reference barcode using an empirically-derived relationship. In some aspects, the method further includes creating a library of reference barcodes by obtaining the plurality of reference barcodes at a corresponding plurality of known reference temperatures.

Other objects and features will be in part apparent and in part pointed out hereinafter.

DESCRIPTION OF THE DRAWINGS

The following drawings illustrate various aspects of the disclosure. Those of skill in the art will understand that the drawings, described below, are for illustrative purposes only. The drawings are not intended to limit the scope of the present teachings in any way.

DETAILED DESCRIPTION OF THE INVENTION

Figure 1:
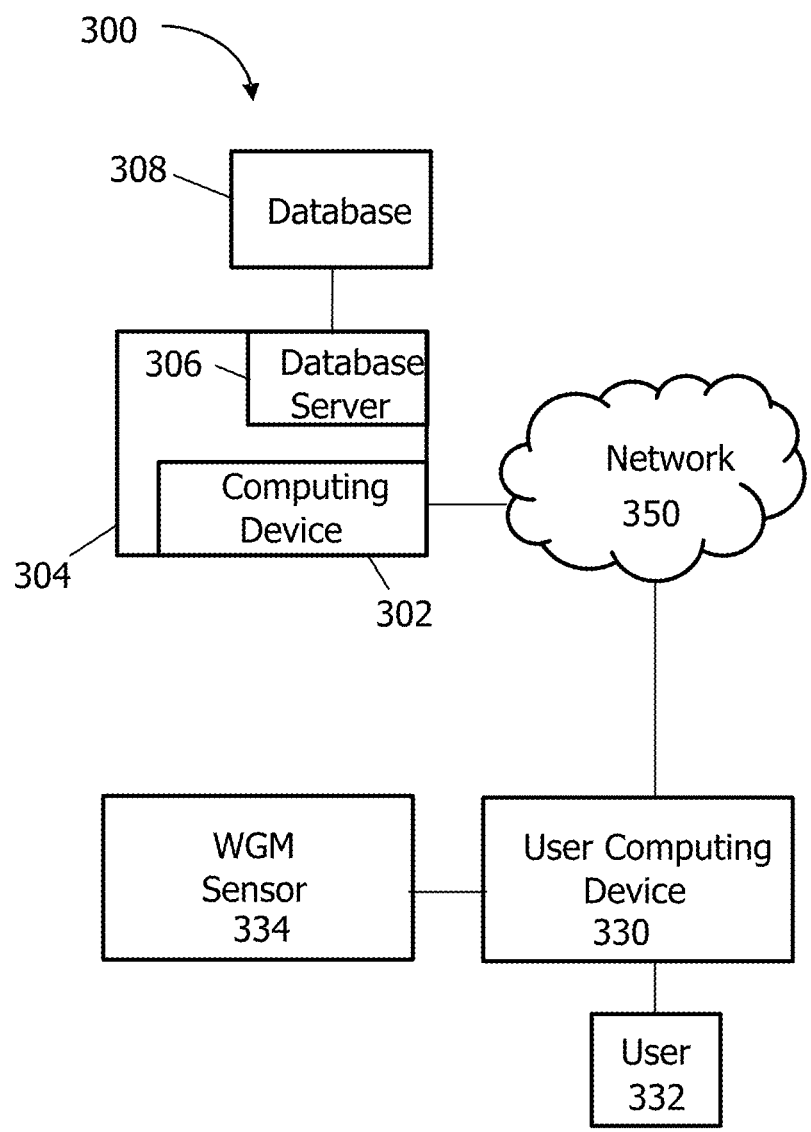
FIG. 1 is a block diagram schematically illustrating a system in accordance with one aspect of the disclosure.

Temperature is one of the most fundamental physical properties to characterize various physical, chemical, and biological processes. Even slight temperature changes could have an impact on the status or dynamics of a system. Thus, there is a great need for high-precision and large-dynamic-range temperature measurements. Conventional temperature sensors encounter difficulties in high-precision thermal sensing on the submicron scale. Optical whispering gallery mode (WGM) sensors have shown promise for many sensing applications, such as thermal sensing, magnetic detection, and biosensing. However, existing sensing methods for WGM resonators rely on tracking changes in a single spectral mode, which limits the dynamic range of the sensor. To track changes in a single spectral mode, the laser source must be fine-tuned in a timely manner to follow the selected mode during the measurement. Further, only relative temperature changes rather than the actual temperature may be derived directly from the spectrum using existing single-mode tracking methods.

In various aspects, devices, systems, and methods of optical sensing that make use of an optical WGM barcode technique are disclosed. The optical WGM barcode technique simultaneously monitors the patterns of multiple modes of the transmission spectrum of a WGM sensor including, but not limited to, a microbubble resonator (MBR). The optical WGM barcode technique provides for obtaining a direct temperature readout from the measured transmission spectrum. The optical WGM barcode technique analyzes patterns of multiple modes in the WGM spectrum instead of the changes of a particular mode within the spectrum. The optical WGM barcode technique provides significantly more information than the single-mode spectrum, including, but not limited to, the precise measurement of actual temperatures. Leveraging the high sensitivity of WGMs and eliminating the need to monitor particular spectral modes, the incorporation of the disclosed optical WGM barcode technique provides for high-performance temperature sensing with enhanced sensitivity and broader dynamic range relative to optical sensor systems using single-mode tracking.

In various aspects, the optical WGM barcode technique obtains information from the collective behavior of multiple modes in the WGM spectrum. The transmission spectrum of a WGM resonator has distinct spectral features (resonant wavelengths, mode spacing, coupling depths, linewidths, etc.) at different temperatures such that temperature uniquely determines the overall pattern of the spectrum of the WGM resonator. Consequently, the actual temperature of the WGM resonator may be determined based on the overall pattern of the resonator's spectrum. It is to be noted that measurements obtained using the optical WGM barcode technique are not limited to specific groups of modes within a transmission spectrum. Instead, the barcode-based sensing technique makes use of collective multimode information to measure the temperature directly from patterns within the WGM spectrum. The disclosed optical WGM barcode technique overcomes the limitations of conventional thermal sensing based on single-mode tracking.

The WGM barcode technique integrates high-sensitivity, high-resolution, and large-dynamic-range measurement into a high-performance sensing platform without the need for extra complicated designs and expensive components. In addition, the technique can, in principle, be adopted for other types of optical resonant-based sensors with rich modal features, such as surface plasmon resonance sensors, photonic crystal sensors, inline fiber interferometers, and even fluorescent and lasing-based sensors. In various aspects, the WGM barcode technique may have a variety of potential applications, including, but not limited to physical thermodynamics, chemical thermodynamics, robotic sensing, and various thermal phenomena in biomedical research.

As described in the examples below, the optical WGM barcode technique for direct readout of an actual temperature with high precision based on the multimode spectrum of a WGM resonator is demonstrated. The sensitivity of the WGM sensor based on multimode sensing was found to be 4.5 pm/° C., and the detection limit may reach as low as 0.002° C.

The examples further demonstrated the measurement of large temperature changes and the observation of large collective shifts of over 275 pm, far exceeding the fine scanning limitation of the lasers used in the experiments of these examples. These results confirm that the WGM barcode technique is capable of analyzing the spectrum over large ranges, therefore overcoming the limitation in the dynamic range of previous WGM sensors without sacrificing the resolution. In addition, non-contact temperature measurements were also demonstrated, making the disclosed optical WGM barcode technique potentially useful in hazardous or corrosive environments.

The examples further demonstrate real-time temperature measurements during the spontaneous evaporation of microdroplets. These results reveal opportunities for the use of the disclosed devices, systems, and methods for the study of transient thermal dynamics of physical and chemical processes.

Although the disclosed optical WGM sensing devices, systems, and methods are described herein in terms of thermal sensing, these devices, systems, and methods may be adapted for use for the measurement of any other phenomenon that may be measured using WGM sensors without limitation. Non-limiting examples of sensing applications that may be implemented using the disclosed WGM devices, systems, and methods include biochemical sensing, nanoparticle detection, magnetic detection, photoacoustic detection, and any other suitable sensing application without limitation. By way of non-limiting example, a resonator-based magnetic field sensor may make use of whole-spectrum resonance mode separation, coupling depth, and linewidth changes at different levels of magnetic field intensity as barcode features to determine magnetic field intensity based on the measured barcode features.

In some aspects, the barcode technique may be used for different sensing applications with minimal, if any, modifications to the hardware of WGM optical sensing. Even if some modes shift out of the scanning range, the measured values, including, but not limited to, the magnetic field intensity may be based on the overall pattern of the spectrum.

WGM Thermal Sensing System

Figure 5A:
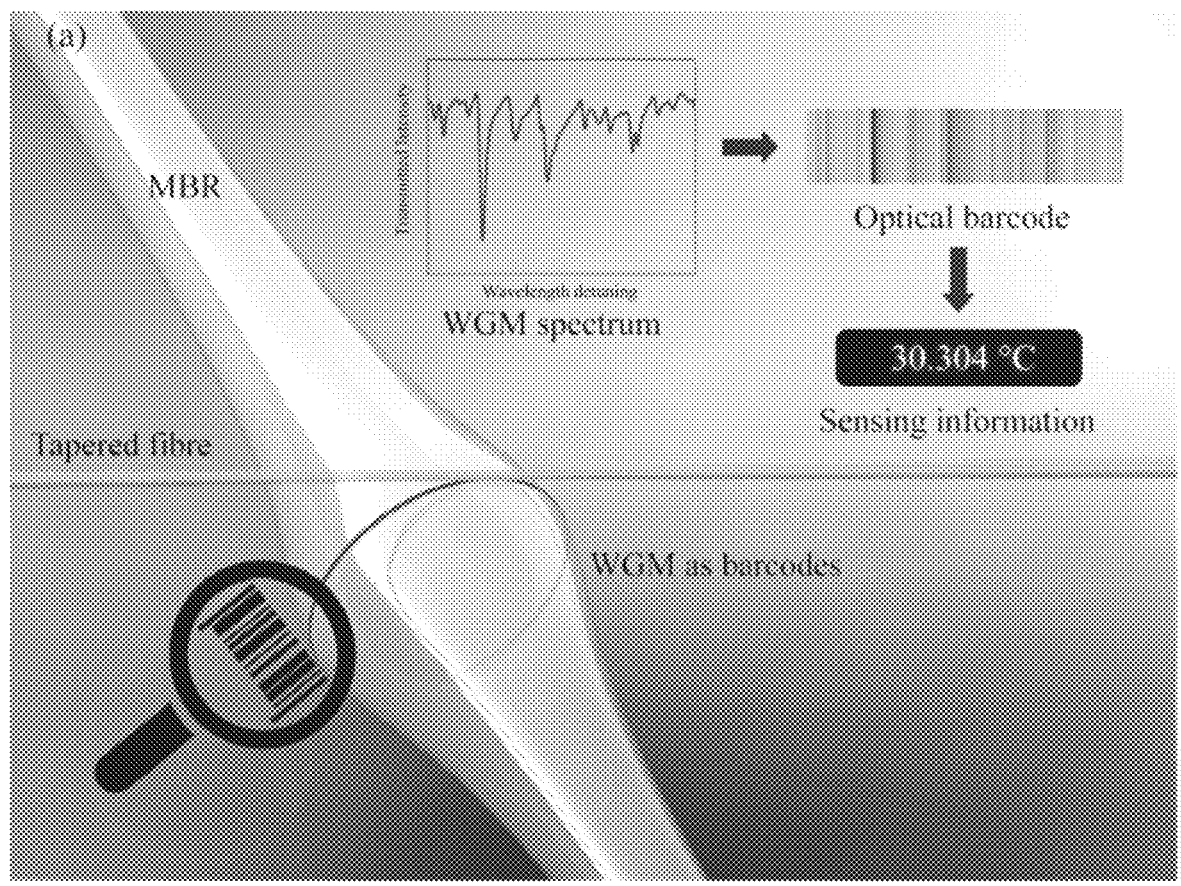
FIG. 5A is a schematic diagram illustrating the operation of a WGM sensing system using the optical barcode technique in one aspect. The light is coupled into and out of a microbubble resonator (MBR) via a tapered fiber. Sensing information is obtained directly from the optical barcode generated from the transmission spectrum of the MBR.
Figure 5B:
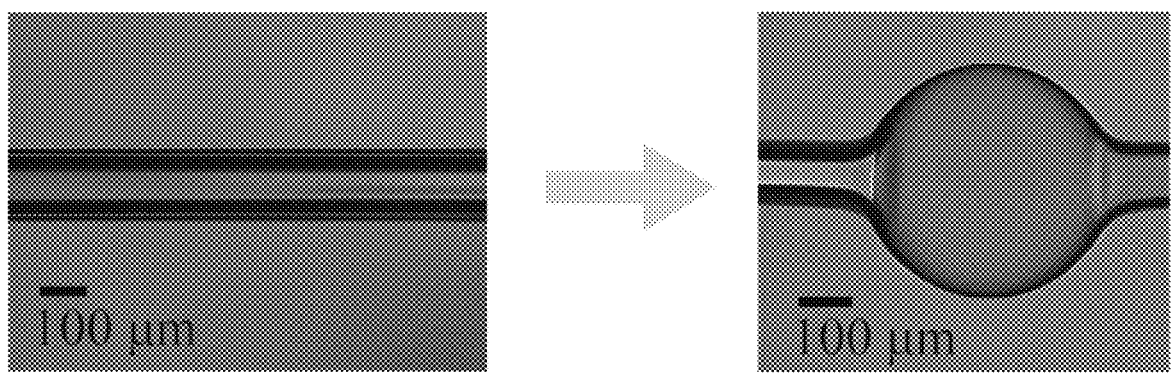
FIG. 5B is an optical micrograph image of the capillary (left) and MBR (right) in one aspect. The MBR is in the middle supported by capillaries on both sides.

In various aspects, an optical thermal sensing system that makes use of the optical WGM barcode technique to measure temperature directly from relative collective shifts in the transmission spectrum from a WGM resonator is disclosed herein. FIG. 5D is a schematic overview of an optical thermal sensing system in one aspect. As illustrated in FIG. 5D, the system includes a whispering gallery mode (WGM) sensor and a computing device. The WGM sensor includes a WGM resonator that is operatively coupled to a tunable laser source and a photodetector.

In various aspects, the WGM resonator may be any suitable WGM resonator capable of supporting multiple resonance modes within a spectrum without limitation. In some aspects, the WGM resonator supports a plurality of non-degenerate whispering gallery mode resonance modes. Non-limiting examples of suitable WGM resonators include microtoroids, microspheres, microbubbles, and any other suitable optical WGM resonator without limitation. Descriptions of WGM resonators are provided in U.S. Patent Application Publication No. 2019/0257698 and in PCT Patent Application Publication No. WO/2021/055823, the contents of which are incorporated by reference herein in their entirety. In one exemplary aspect, the WGM resonator is a microbubble resonator (WBR), as described in the examples below and as shown illustrated in FIGS. 5A and 5B.

Microbubble resonators (MBRs) are suitable for the WGM thermal sensing mechanism since they typically have a dense WGM spectrum resulting from their highly oblate geometry, which supports many non-degenerate WGMs. The MBR in FIG. 5B is packaged on a substrate (FIG. 5C) to improve the robustness and stability of the entire sensor system. The WGM spectrum is measured using a sensing system similar to the system illustrated in FIG. 5D and described herein.

Figure 5C:
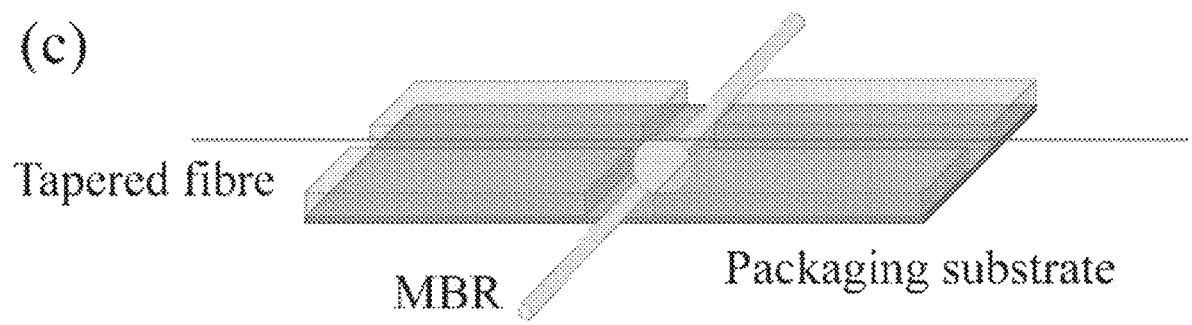
FIG. 5C is a schematic diagram illustrating a packaged substrate containing the MBR of FIG. 5B and a tapered fiber in one aspect.
Figure 5D:
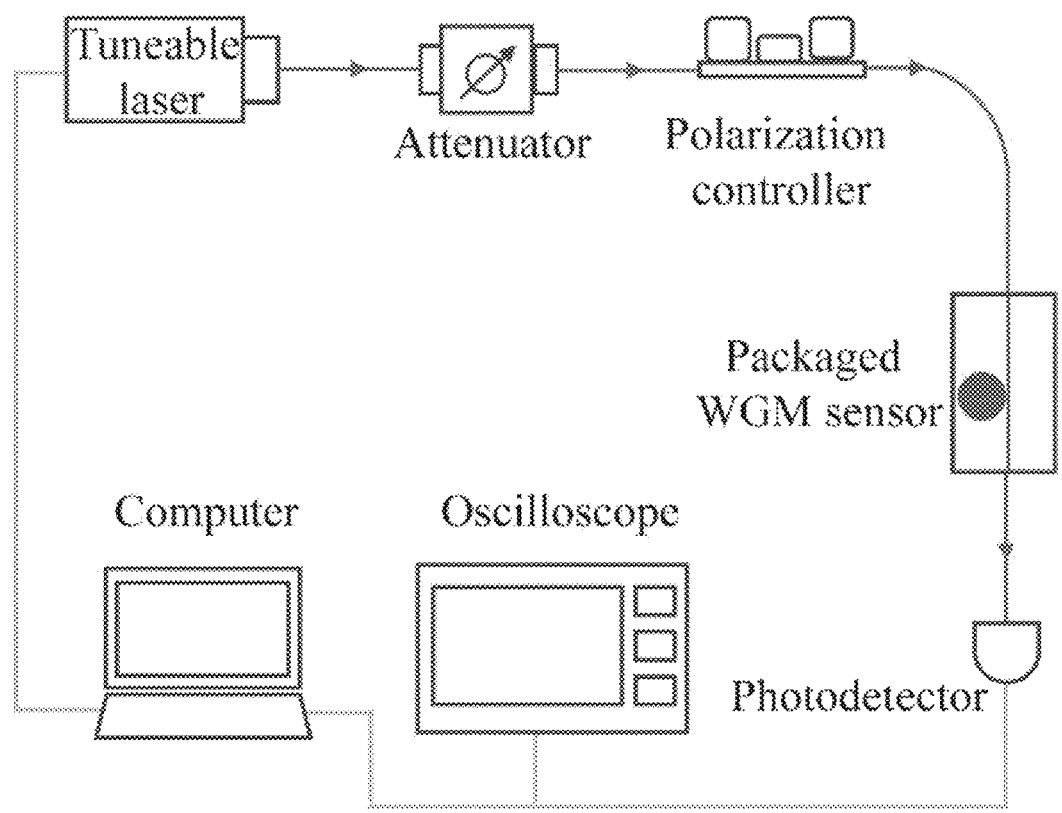
FIG. 5D is a schematic diagram illustrating the elements of a WGM sensing system using the optical barcode technique in one aspect. The light from a tunable laser is used to probe the spectrum of the packaged WGM sensor of FIG. 5C. The light intensity is controlled by an attenuator and the polarization is controlled by a polarization controller. The transmission spectrum is received by a photodetector, which is connected to an oscilloscope and a computer with a data acquisition card for control of laser scanning and signal processing.

In various other aspects, the WGM sensor further includes a taper fiber waveguide configured to couple light produced by the tunable laser source into the WGM resonator, as shown in FIG. 5C. In some aspects, the taper fiber waveguide and the WGM resonator may be packaged within a low refractive index polymer to maintain the taper fiber waveguide and the WGM resonator in a fixed spatial arrangement configured to enhance the performance and sensitivity of the WGM sensor. In one aspect, shown illustrated in FIG. 5C, the WGM resonator (MBR) and taper fiber waveguide may be positioned within grooves formed within a substrate. A low index polymer may be layered over the WGM resonator (MBR) and taper fiber waveguide to hold these elements in place. Non-limiting examples of suitable low-index polymers include a low refractive index UV curable adhesive (MY132A), as described in the examples below.

Referring again to FIG. 5D, the taper fiber waveguide of the WGM sensor may be operatively coupled to a tunable laser at one end and to a photodetector at an opposite end. In some aspects, light produced by the tunable laser may be conditioned by one or more optical elements including, but not limited to, an attenuator, a polarization controller, and any other suitable optical elements.

In some aspects, polarization control may be incorporated into optical sensing systems making use of the disclosed WGM barcode technique to ensure consistent spectra. In one aspect, the inclusion of polarization-maintaining optical fibers may be used for polarization control. In another aspect, materials with a large thermo-optical coefficient may be injected into the core of the MBRs to enhance the sensitivity of the disclosed optical sensing systems. In an additional aspect, noise-suppression techniques including, but not limited to, power and frequency stabilization of lasers and self-referencing techniques, may be implemented to further improve the detection limit.

Figure 6A:
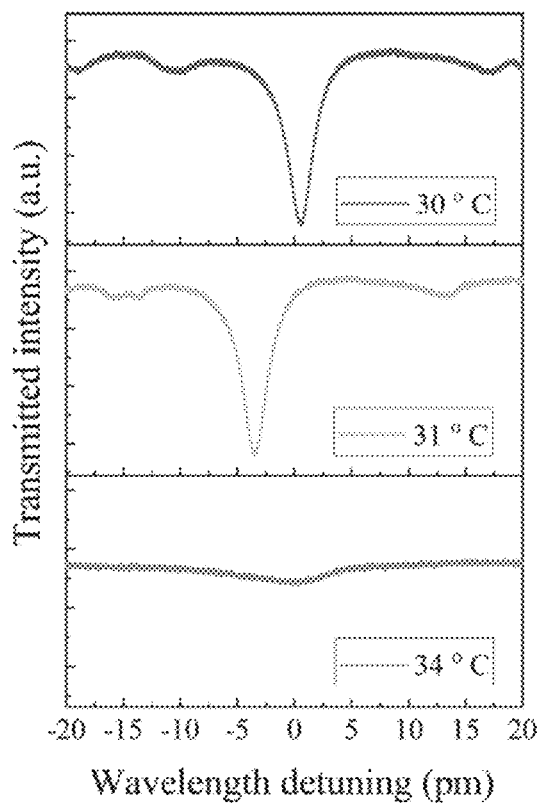
FIG. 6A contains a series of graphs comparing the WGM spectra for a conventional single-mode tracking method (left) and the disclosed barcode sensing method with multiple modes obtained using the WGM sensing system of FIG. 5D (right). In the WGM spectra for single-mode tracking, tracking of resonance is not possible as the mode shifts out of the scanning range at 34° C. In the WGM spectra for barcode sensing with multiple modes, the resonant wavelengths, spacing between modes, linewidths, and coupling depths are determined by the temperature.
Figure 6A:
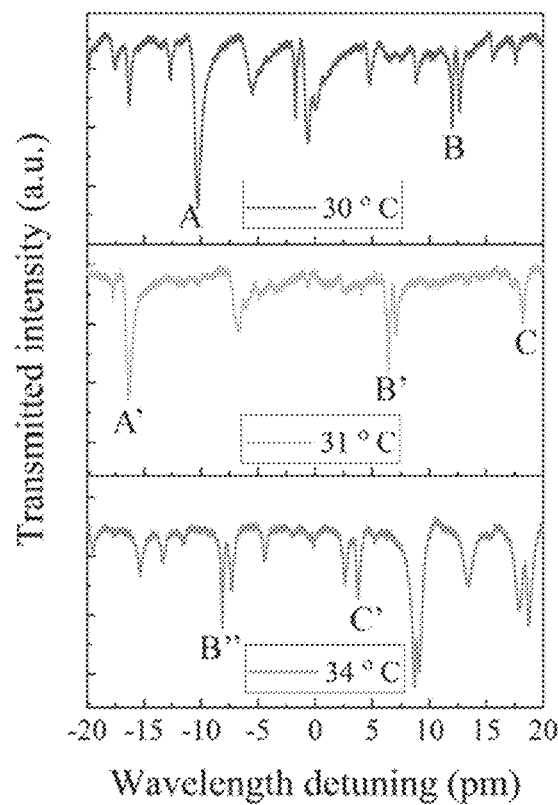

In various aspects, the taper fiber waveguide of the WGM sensor carries the input spectrum produced by the tunable laser past the WGM resonator. Light passing through the taper fiber waveguide may couple into the WGM resonator to varying degrees, depending on the resonance modes supported by the WGM resonator. The transmission spectrum exiting the taper fiber waveguide to be detected by the photodetector includes multiple resonance modes characterized by sharp drops in transmitted light intensity due to enhanced coupling into the WGM resonator at the resonance wavelengths. FIG. 6A (right) is an illustration of various transmission spectra detected by the photodetector of a WGM thermal sensing system in one aspect. It is to be noted that the transmission spectra are unique for each temperature within the working range of the WGM thermal sensing system.

In various aspects, the photodetector may be any suitable photodetection device without limitation including, but not limited to, a photodiode. The photodetector is configured to detect light intensity and to produce a plurality of electrical signals encoding the detected intensities of the transmission spectra. As illustrated in FIG. 5D, the WGM thermal sensing system may further include additional analysis devices including, but not limited to, an oscilloscope configured to transform a plurality of detector signals from the photodetector into a transmission spectrum suitable for analysis by a computing device operatively connected to the oscilloscope. The computing device of the WGM thermal sensing system is described in additional detail below.

Method

In various aspects, a computer-aided method for obtaining high-precision, wide-ranging measurements is disclosed that makes use of the WGM sensing system described above. In various aspects, the WGM thermal sensing system transforms changes in the transmission spectrum of the WGM resonator using a WGM barcode sensing mechanism. The WGM barcode sensing mechanism relies on analyzing the collective pattern of the WGM spectrum, which changes with temperature, as illustrated in FIG. 5A.

Before an actual temperature measurement, multiple spectra are recorded and characterized as standard barcodes at different temperatures for calibration. Then, at a particular temperature, the spectrum of the sensor is measured, and an optical barcode is subsequently generated. By comparing its collective pattern with the barcode patterns in the pre-calibrated database and searching for the pattern with the best overlap, the actual temperature can be determined. To achieve this, we use the cross-correlation function to quantitatively estimate the similarity and relative collective shift of two barcodes. Suppose the measured barcode vector is $x_n$ and that of the standard barcode in the database to be compared is $y_n$. The cross-correlation function calculates the collective shift between them and can be used to evaluate their similarities:

$$R_{xy}(m) = \begin{cases} \sum_{n=0}^{N-m-1} x_{n+m} y_n^*, & m \geq 0, \\ R_{yx}^*(-m), & m < 0 \end{cases}$$

where m is the shift index and N is the number of elements in the barcode array. If $x_n$ and $y_n$ are similar, then the largest element in R is located at the shift value where the elements of x and y best match; otherwise, R is a null matrix. Using the cross-correlation function, we can find the best overlapping barcode and derive the actual temperature by taking into account the small temperature deviation (relative collective shift). This is a direct measurement of the actual temperature rather than a measurement of the relative temperature difference. Additionally, since we do not rely on tracking the shift of particular modes, this sensing would still be applicable even if particular modes shift out of the spectrum in the measurement.

Although the disclosed computer-aided methods for obtaining high-precision, wide-ranging measurements are generally described herein in terms of thermal measurements, the disclosed methods may be used to obtain any type of measurement implemented using WGM resonator-based sensors without limitation. Non-limiting examples of suitable measurements that may be obtained using the methods disclosed herein include acoustic measurements, pressure measurements, force measurements, electromagnetic measurements, analyte detection measurements, and any other suitable measurement without limitation.

Computing Device

In various aspects, the disclosed method of obtaining optical thermal measurements using the WGM barcode technique may be implemented using a computing system or computing device. FIG. 1 depicts a simplified block diagram of the system for implementing the computer-aided methods of optical thermal measurements using the WGM barcode technique described herein. As illustrated in FIG. 1, the computing device 300 may be configured to implement at least a portion of the tasks associated with the disclosed methods of optical thermal measurements using the WGM barcode technique described herein. The computer system 300 may include a computing device 302. In one aspect, the computing device 302 is part of a server system 304, which also includes a database server 306. The computing device 302 is in communication with database 308 through the database server 306. The computing device 302 is communicably coupled to a user computing device 330 through a network 350. The computing device 302 is also communicably coupled to a WGM sensor 334 (WGM resonator operatively coupled to a tunable laser and photodetector) through a network 350. The network 350 may be any network that allows local area or wide area communication between the devices. For example, network 350 may allow communicative coupling to the Internet through at least one of many interfaces including, but not limited to, at least one of a network, such as the Internet, a local area network (LAN), a wide area network (WAN), an integrated services digital network (ISDN), a dial-up-connection, a digital subscriber line (DSL), a cellular phone connection, and a cable modem. The user computing device 330 may be any device capable of accessing the Internet including, but not limited to, a desktop computer, a laptop computer, a personal digital assistant (PDA), a cellular phone, a smartphone, a tablet, a phablet, wearable electronics, smartwatch, or other web-based connectable equipment or mobile devices.

Figure 2:
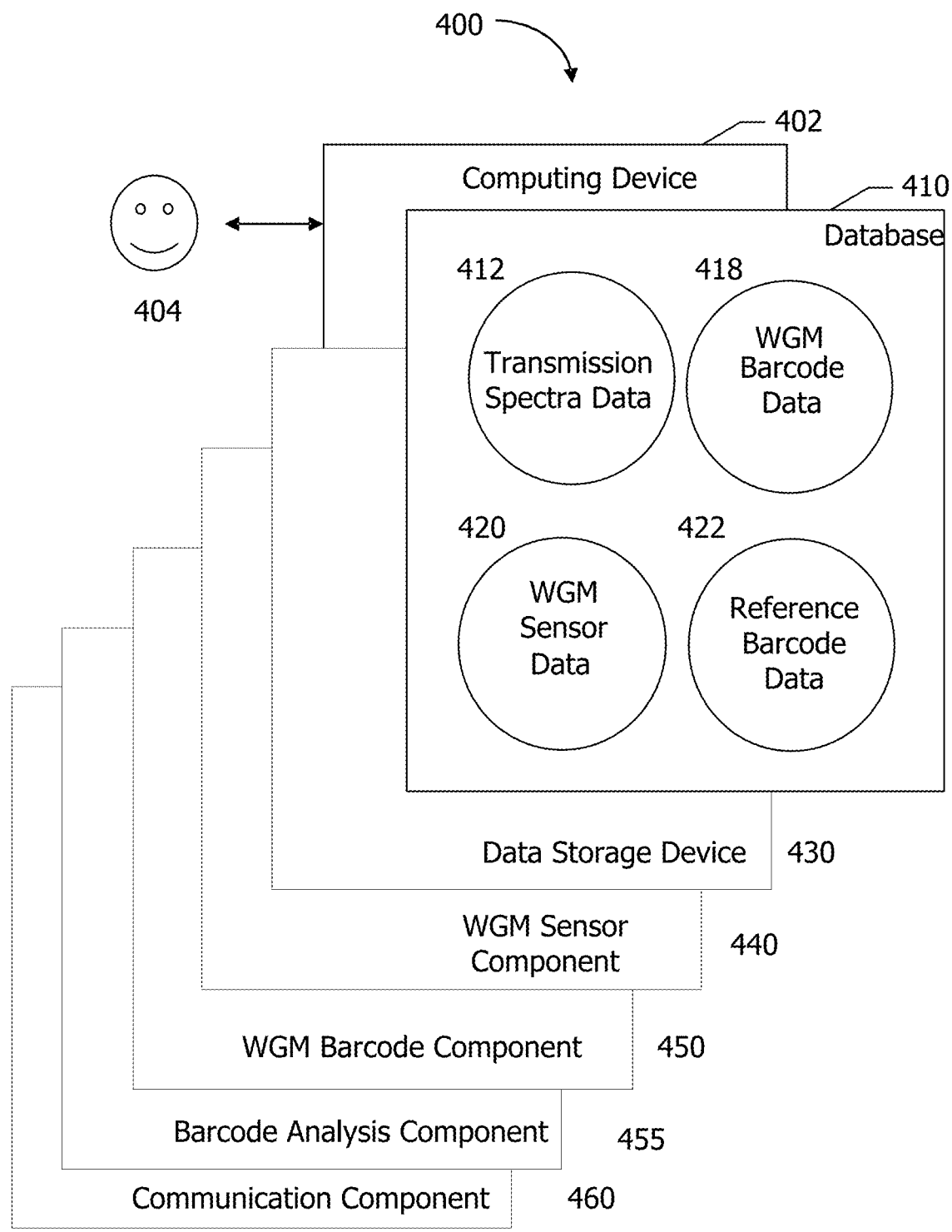
FIG. 2 is a block diagram schematically illustrating a computing device in accordance with one aspect of the disclosure.

In other aspects, the computing device 302 is configured to perform a plurality of tasks associated with the disclosed methods of optical thermal measurements using the WGM barcode technique. FIG. 2 depicts a component configuration 400 of computing device 402, which includes database 410 along with other related computing components. In some aspects, computing device 402 is similar to computing device 302 (shown in FIG. 1). A user 404 may access components of computing device 402. In some aspects, database 410 is similar to database 308 (shown in FIG. 1).

In one aspect, database 410 includes transmission spectra data 412, WGM barcode data 418, WGM system data 420, and reference barcode data 422. In one aspect, transmission spectra data 412 include values indicative of the signals produced by the photodetector of the WGM sensor in response to detecting a transmission spectrum delivered by the taper fiber waveguide. In one aspect, WGM barcode data 418 includes various parameters used to transform a transmission spectrum into a WGM barcode including but not limited to, colormap parameters. The WGM barcode data 418 may further include matrices of values defining measured barcodes produced from the transmission spectra data 412. In an additional aspect, the WGM sensor data 420 may include various parameters used to operate the tunable laser, detector, oscilloscope, and any other element of the WGM sensor to operate the WGM sensor. In another additional aspect, the reference barcode data may include stored matrices of values defining each reference barcode and corresponding reference temperature of the reference barcode library.

The computing device 402 also includes a number of components that perform specific tasks associated with the disclosed methods of optical thermal measurements using the WGM barcode technique. In the exemplary aspect, computing device 402 includes a data storage device 430, a WGM sensor component 440, a WGM barcode component 450, a barcode analysis component, and a communication component 460. The data storage device 430 is configured to store data received or generated by the computing device 402, such as any of the data stored in the database 410 or any outputs of processes implemented by any component of the computing device 402.

The WGM sensor component 440 enables the operation of the tunable laser to produce input spectrum sweeps and the operation of the photodetector and associated analysis components of the WGM sensor to detect the transmission spectrum using the disclosed method as described herein. In various aspects, the WGM sensor component 440 is configured to transform the signals produced by the photodetector into a transmission spectrum. The WGM barcode component 450 enables the transformation of the transmission spectrum into a measured WGM barcode indicative of various features of the measured transmission spectrum as described herein. The barcode analysis component 455 enables the transformation of the measured WGM barcode into a temperature by cross-correlation of the measured WGM barcode to the library of reference barcodes as described herein.

The communication component 460 is configured to enable communications between computing device 402 and other devices (e.g. user computing device 330 shown in FIG. 1) over a network, such as a network 350 (shown in FIG. 1), or a plurality of network connections using predefined network protocols such as TCP/IP (Transmission Control Protocol/Internet Protocol).

Figure 3:
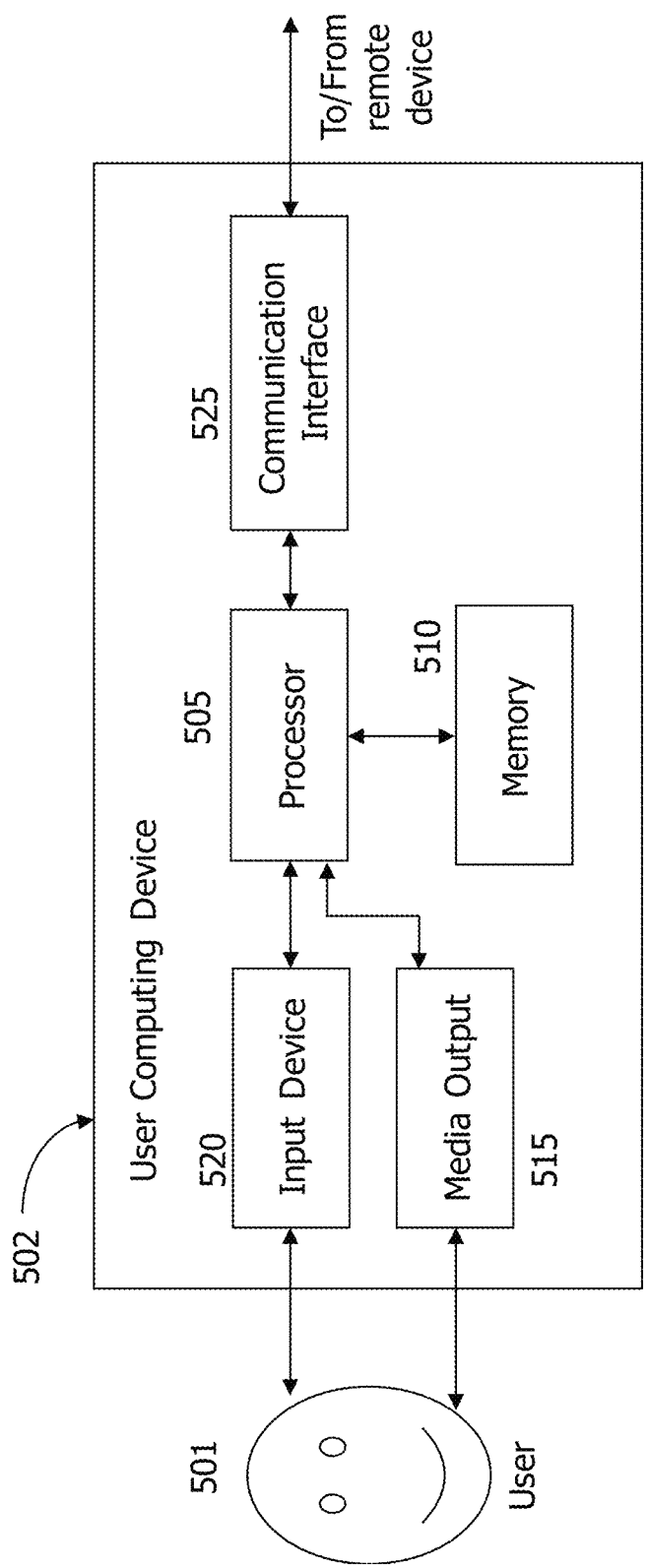
FIG. 3 is a block diagram schematically illustrating a remote or user computing device in accordance with one aspect of the disclosure.

FIG. 3 depicts a configuration of a remote or user computing device 502, such as user computing device 330 (shown in FIG. 1). Computing device 502 may include a processor 505 for executing instructions. In some aspects, executable instructions may be stored in a memory area 510. Processor 505 may include one or more processing units (e.g., in a multi-core configuration). Memory area 510 may be any device allowing information such as executable instructions and/or other data to be stored and retrieved. Memory area 510 may include one or more computer-readable media.

Computing device 502 may also include at least one media output component 515 for presenting information to a user 501. Media output component 515 may be any component capable of conveying information to user 501. In some aspects, media output component 515 may include an output adapter, such as a video adapter and/or an audio adapter. An output adapter may be operatively coupled to processor 505 and operatively coupleable to an output device such as a display device (e.g., a liquid crystal display (LCD), organic light-emitting diode (OLED) display, cathode ray tube (CRT), or "electronic ink" display) or an audio output device (e.g., a speaker or headphones). In some aspects, media output component 515 may be configured to present an interactive user interface (e.g., a web browser or client application) to user 501.

In some aspects, computing device 502 may include an input device 520 for receiving input from user 501. Input device 520 may include, for example, a keyboard, a pointing device, a mouse, a stylus, a touch-sensitive panel (e.g., a touchpad or a touch screen), a camera, a gyroscope, an accelerometer, a position detector, and/or an audio input device. A single component such as a touch screen may function as both an output device of media output component 515 and input device 520.

Computing device 502 may also include a communication interface 525, which may be communicatively coupleable to a remote device. Communication interface 525 may include, for example, a wired or wireless network adapter or a wireless data transceiver for use with a mobile phone network (e.g., Global System for Mobile communications (GSM), 3G, 4G, or Bluetooth) or other mobile data network (e.g., Worldwide Interoperability for Microwave Access (WIMAX)).

Stored in memory area 510 are, for example, computer-readable instructions for providing a user interface to user 501 via media output component 515 and, optionally, receiving and processing input from input device 520. A user interface may include, among other possibilities, a web browser and client application. Web browsers enable users 501 to display and interact with media and other information typically embedded on a web page or a website from a web server. A client application allows users 501 to interact with a server application associated with, for example, a vendor or business.

Figure 4:
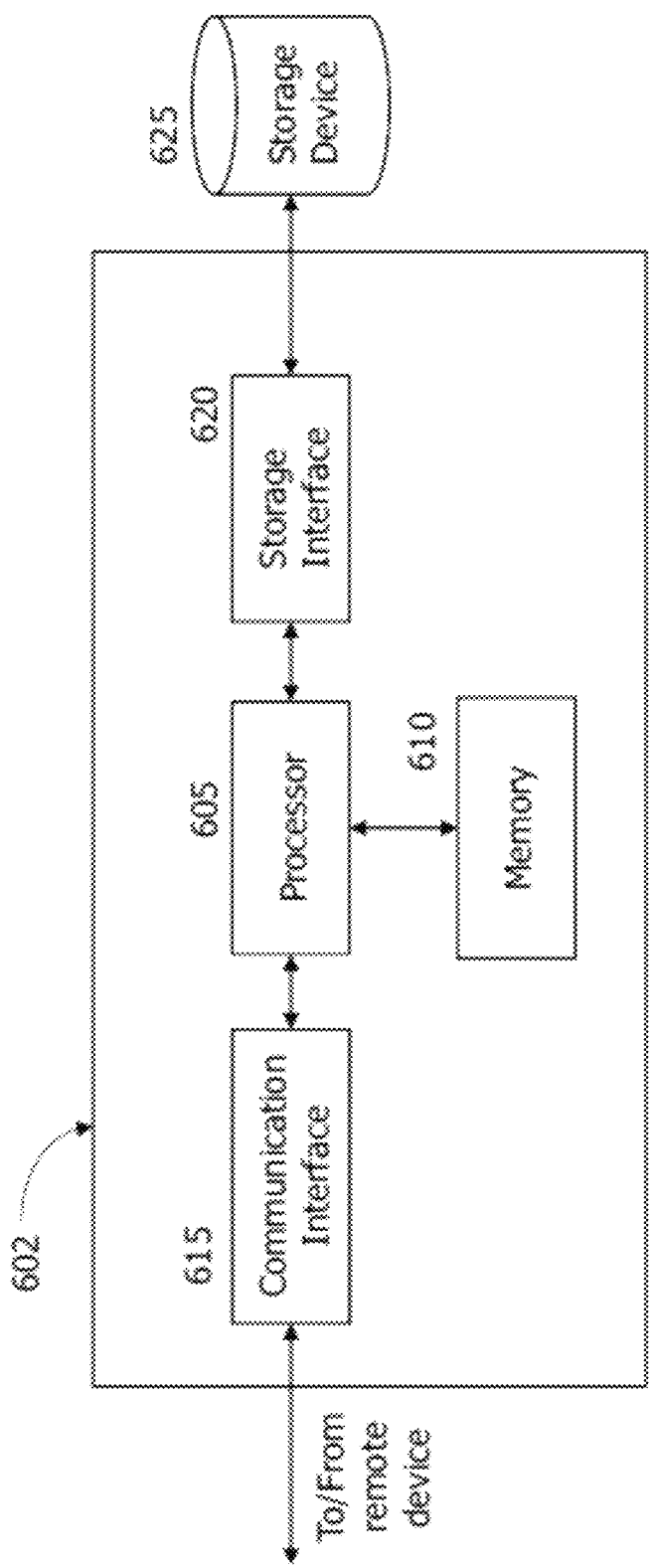
FIG. 4 is a block diagram schematically illustrating a server system in accordance with one aspect of the disclosure.

FIG. 4 illustrates an example configuration of a server system 602. Server system 602 may include, but is not limited to, database server 306 and computing device 302 (both shown in FIG. 1). In some aspects, server system 602 is similar to server system 304 (shown in FIG. 1). Server system 602 may include a processor 605 for executing instructions. Instructions may be stored in a memory area 625, for example. Processor 605 may include one or more processing units (e.g., in a multi-core configuration).

Processor 605 may be operatively coupled to a communication interface 615 such that server system 602 may be capable of communicating with a remote device such as user computing device 330 (shown in FIG. 1) or another server system 602. For example, communication interface 615 may receive requests from a user computing device 330 via a network 350 (shown in FIG. 1).

Processor 605 may also be operatively coupled to a storage device 625. Storage device 625 may be any computer-operated hardware suitable for storing and/or retrieving data. In some aspects, storage device 625 may be integrated into server system 602. For example, server system 602 may include one or more hard disk drives as storage device 625. In other aspects, storage device 625 may be external to server system 602 and may be accessed by a plurality of server systems 602. For example, storage device 625 may include multiple storage units such as hard disks or solid-state disks in a redundant array of inexpensive disks (RAID) configuration. Storage device 625 may include a storage area network (SAN) and/or a network attached storage (NAS) system.

In some aspects, processor 605 may be operatively coupled to storage device 625 via a storage interface 620. Storage interface 620 may be any component capable of providing processor 605 with access to storage device 625. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 625.

Memory areas 510 (shown in FIG. 3) and 610 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for the storage of a computer program.

The computer systems and computer-aided methods discussed herein may include additional, less, or alternate actions and/or functionalities, including those discussed elsewhere herein. The computer systems may include or be implemented via computer-executable instructions stored on non-transitory computer-readable media. The methods may be implemented via one or more local or remote processors, transceivers, servers, and/or sensors (such as processors, transceivers, servers, and/or sensors mounted on vehicle or mobile devices, or associated with smart infrastructure or remote servers), and/or via computer-executable instructions stored on non-transitory computer-readable media or medium.

In some aspects, a computing device is configured to implement machine learning, such that the computing device "learns" to analyze, organize, and/or process data without being explicitly programmed. Machine learning may be implemented through machine learning (ML) methods and algorithms. In one aspect, a machine learning (ML) module is configured to implement ML methods and algorithms. In some aspects, ML methods and algorithms are applied to data inputs and generate machine learning (ML) outputs. Data inputs may include but are not limited to images or frames of a video, object characteristics, and object categorizations. Data inputs may further include sensor data, image data, video data, telematics data, authentication data, authorization data, security data, mobile device data, geolocation information, transaction data, personal identification data, financial data, usage data, weather pattern data, "big data" sets, and/or user preference data. ML outputs may include but are not limited to: a tracked shape output, categorization of an object, categorization of a region within a medical image (segmentation), categorization of a type of motion, a diagnosis based on the motion of an object, motion analysis of an object, and trained model parameters ML outputs may further include: speech recognition, image or video recognition, medical diagnoses, statistical or financial models, autonomous vehicle decision-making models, robotics behavior modeling, fraud detection analysis, user recommendations and personalization, game AI, skill acquisition, targeted marketing, big data visualization, weather forecasting, and/or information extracted about a computer device, a user, a home, a vehicle, or a party of a transaction. In some aspects, data inputs may include certain ML outputs.

In some aspects, at least one of a plurality of ML methods and algorithms may be applied, which may include but are not limited to: genetic algorithms, linear or logistic regressions, instance-based algorithms, regularization algorithms, decision trees, Bayesian networks, cluster analysis, association rule learning, artificial neural networks, deep learning, dimensionality reduction, and support vector machines. In various aspects, the implemented ML methods and algorithms are directed toward at least one of a plurality of categorizations of machine learning, such as supervised learning, unsupervised learning, adversarial learning, and reinforcement learning.

The methods and algorithms of the invention may be enclosed in a controller or processor. Furthermore, methods and algorithms of the present invention, can be embodied as a computer-implemented method or methods for performing such computer-implemented method or methods, and can also be embodied in the form of a tangible or non-transitory computer-readable storage medium containing a computer program or other machine-readable instructions (herein "computer program"), wherein when the computer program is loaded into a computer or other processor (herein "computer") and/or is executed by the computer, the computer becomes an apparatus for practicing the method or methods. Storage media for containing such computer programs include, for example, floppy disks and diskettes, compact disk (CD)-ROMs (whether or not writeable), DVD digital disks, RAM and ROM memories, computer hard drives and backup drives, external hard drives, "thumb" drives, and any other storage medium readable by a computer. The method or methods can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the method or methods. The method or methods may be implemented on a general-purpose microprocessor or on a digital processor specifically configured to practice the process or processes. When a general-purpose microprocessor is employed, the computer program code configures the circuitry of the microprocessor to create specific logic circuit arrangements. Storage medium readable by a computer includes medium being readable by a computer per se or by another machine that reads the computer instructions for providing those instructions to a computer for controlling its operation. Such machines may include, for example, machines for reading the storage media mentioned above.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are openended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application, or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

EXAMPLES

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1—Fabrication of Microbubble Resonators

To demonstrate a method of fabricating packaged microbubble resonators for use in the optical sensing stems disclosed herein, the following experiments were conducted.

Microbubble resonators (MBRs) were fabricated from silica capillaries by a "heat and expand" approach. Before fabrication, the polymer coating on the capillary was burnt out with a flame. One end of the capillary was sealed, and the other end was connected to a pressure control system. The capillary was then heated with a Vytran glass processor (~60 W), and the pressure inside the capillary was increased (~1.5 atm) simultaneously to gradually expand the capillary into a bubble shape (FIG. 5B). The diameter of the microbubble was controlled by modulating the pressure and the heating power used. The Q-factors of the resulting MBRs were in the range of 106-107. To excite WGMs in the MBR, a tapered fiber waveguide was used to couple light into and out of the resonator.

To make a compact sensing system, a packaging technique was used to encapsulate the MBR and the tapered fiber on a 3D printed substrate with dimensions of 8×40×5 mm (width×length×height). As illustrated in FIG. 5C, the MBR and the tapered fiber were suspended inside two perpendicular channels of a substrate such that light from the tapered fiber could be coupled into the MBR. Droplets of a low refractive index UV curable adhesive (MY132A) were used to fill the two channels before they were cured by UV light. After packaging, the small-footprint sensor was able to maintain the coupling efficiency and Q-factors for an extended period, and any mechanical perturbations were greatly suppressed.

Example 2—Characterization of Temperature-Dependent Whisper-Gallery Mode Spectra in Microbubble Resonators To characterize the effect of temperature changes on the transmission spectra of the microbubble resonator (MBR) of Example 1, the following experiments were conducted.

The collective pattern of the whispering gallery mode (WGM) spectrum is at the heart of the sensing mechanism of optical sensing systems using MBRs described herein. A packaged WGM sensor in the form of the encapsulated MBR of Example 1 was incorporated into an optical sensing system as illustrated in FIG. 5D. The optical sensing system included the WGM sensor with the MBR positioned between the two ends of a tapered fiber. The optical sensing system further included a tunable laser source to direct light energy conditioned by an attenuator and a polarization controller into one end of the tapered fiber of the WGM sensor. The optical sensing system further included a photodetector and associated analysis elements (oscilloscope, computer) coupled to the second end of the tapered fiber opposite to the tunable laser to receive the transmitted light energy.

To obtain the WGM spectrum, the tuneable laser source in the 780 nm band (TLB-6712) was used to scan across multiple modes, and the transmission spectrum was received by the photodetector. The 780 nm wavelength band was used to avoid large absorption in the infrared in order to obtain high Q-factors and consequently achieve high resolution. The signals from the photodetector were displayed on an oscilloscope for observation and connected to a computer through a data acquisition card for analysis. The data acquisition card also generated a triangle wave for wavelength scanning of the laser. The modulation voltage was ±1 V, with a modulation frequency of 60 Hz, driving the laser scanning from −20 μm to 20 pm around the center wavelength. This scanning range provided a high resolution to resolve subtle changes in the multimode spectrum. The light intensity was adjusted by an optical attenuator, and the polarization was controlled by a polarization controller. To enhance stability, the laser power was kept low (~65 μW) to minimize optothermal effects, which could cause distortion and broadening of the Lorentzian lineshape. The measurement time for each spectrum was ~17 ms, limited by the scanning speed of the laser frequency.

To calibrate the temperature response, the sensor was sandwiched in contact between a Peltier heater and a heatsink. A surface-mount resistance thermometer with a resolution of 0.1° C. was attached to the sensor surface to provide an additional independent measurement of the local temperature as well as PID thermal control of the heater. When the temperature under thermal control became stable at a set value (30° C., 31° C., 32° C., etc.), the WGM spectrum was recorded for 10 s. A standard barcode is generated by averaging the spectra recorded at the same temperature. FIG. 5A illustrates the concept of the WGM barcode technique. During calibration, the heater, thermometer, and sensor were placed inside a wooden cell for thermal isolation. A similar system with a microtoroid resonator with a sparse spectrum substituted for the MBR was similarly tested to compare temperature measurements using existing single-mode spectral shifts to the changes in multi-mode WGM spectra obtained using the MBR sensor as described above.

A comparison between the single-mode tracking and the proposed barcode sensing with multiple modes is shown in FIGS. 6A, 6B, 6C, and 6D. Referring to FIG. 6A, the single-mode spectra (left) were obtained using the microtoroid resonator with a sparse spectrum, and the multimode spectra (right) were obtained using the MBR. The spectra of both resonators were measured at 30° C., 31° C., and 34° C. For single-mode tracking, the mode was only identifiable and trackable within a small temperature change (30° C. to 31° C.). It was impossible to further track the shift as the single mode moves out of the scanning range of the spectrometer. For the multimode spectra, the sensing mechanism involved the collective multimode pattern, rather than the tracking of single-mode shifts.

Figure 6B:
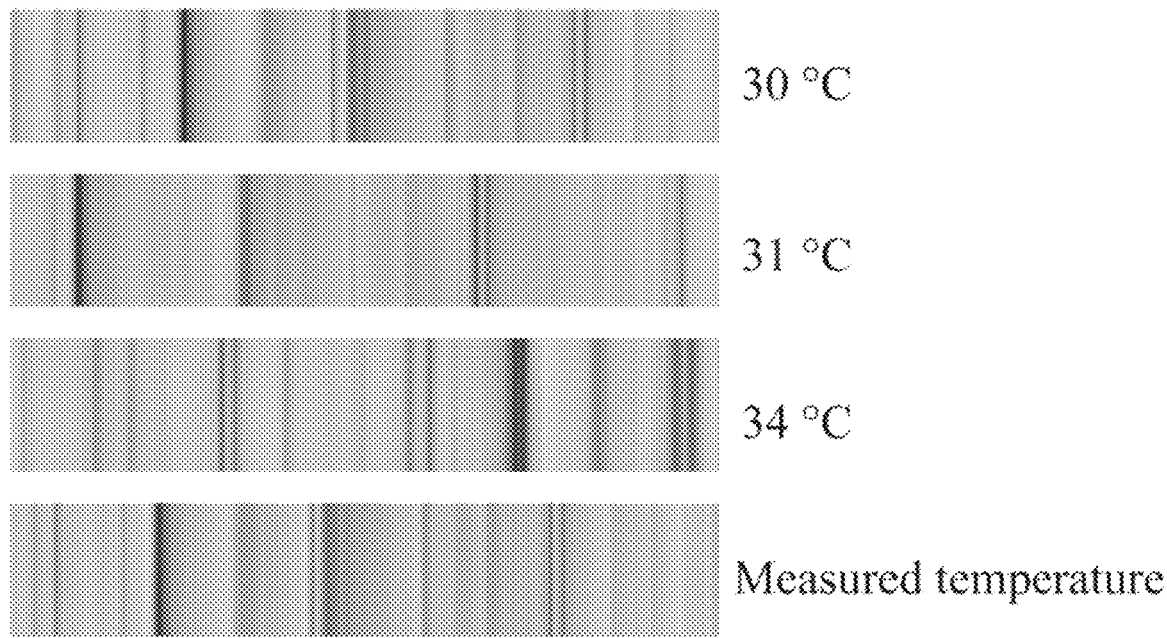
FIG. 6B contains a series of optical barcodes generated using the system of FIG. 5B at different temperatures in one aspect. Each line of a barcode represents a mode from the spectrum. The resonant wavelengths, linewidths, coupling depths, and spacing between modes are converted to the positions, widths, colors, and distance between lines in the barcode, respectively. The measured temperature (bottom) should be close to 30° C. or 31° C., rather than 34° C., based on their pattern similarities with the measured temperature barcode.

As illustrated in FIG. 6B, optical barcodes were generated from the multimode spectra of FIG. 6A that were uniquely associated with each temperature and used to obtain sensing information (temperature) by data analysis. In addition to changes in resonant wavelengths as was performed in sensing systems using single-mode tracking, data sensing based on multimode spectra considered variations in other modal characteristics, such as the spacing between modes, linewidths, and coupling depths that were all included in the data analysis described herein. Referring again to the multimode spectra (right) to FIG. 6A, mode A at 30° C. evolved into mode A' when the temperature increased to 31° C. Besides resonance shift, the linewidth and coupling depth also changed between mode A and mode A'. The linewidth decreased from 0.6252 pm to 0.5164 pm, and the resonance depth changed from 0.148 to 0.392. At 34° C., mode A' shifted out of scanning range. Similarly, mode B evolved into mode B' and further changed to mode B" at 34° C. In addition, at 31° C., a new mode (mode C) emerged and evolved into mode C' at 34° C. These changes in linewidth and coupling strength (depth) were caused by the variation in the coupling gap distance between the fiber and the MBR, induced by the thermal expansion of the materials of the packaged WGM sensor. The variations in spacing were due to the different thermal responses of different modes. As a result, these multiparameter changes of modes can be regarded as a collective behavior, which ultimately changed the overall pattern of each multimode spectrum at different temperatures.

To make full use of the extra information provided by the multimode spectrum, the optical WGM barcode reflected not only the mode positions but also the linewidth and the coupling depth in each spectrum. To achieve this, the transmission intensity in the spectrum was divided into 10000 pieces to form a one-dimensional array. Each element of the array corresponded to a rectangular area in the barcode image, whose color was determined by the value of the spectrum element through a colormap. The colormap used in these experiments was the Parula colormap, which can maintain a smooth color gradient even when plotted in greyscale. The WGM barcodes at various temperatures (FIG. 6B) were generated based on the spectra of FIG. 6A (right). Each optical barcode consisted of multiple lines, and each line represented a mode from the spectrum. The width of each line indicated the linewidth of the mode, and the color of each line reflected its coupling depth. The barcode patterns obtained at the three different temperatures were unique and distinctive, supporting the hypothesis that the collective pattern of the multimode spectrum was uniquely determined by the temperature.

Figure 6C:
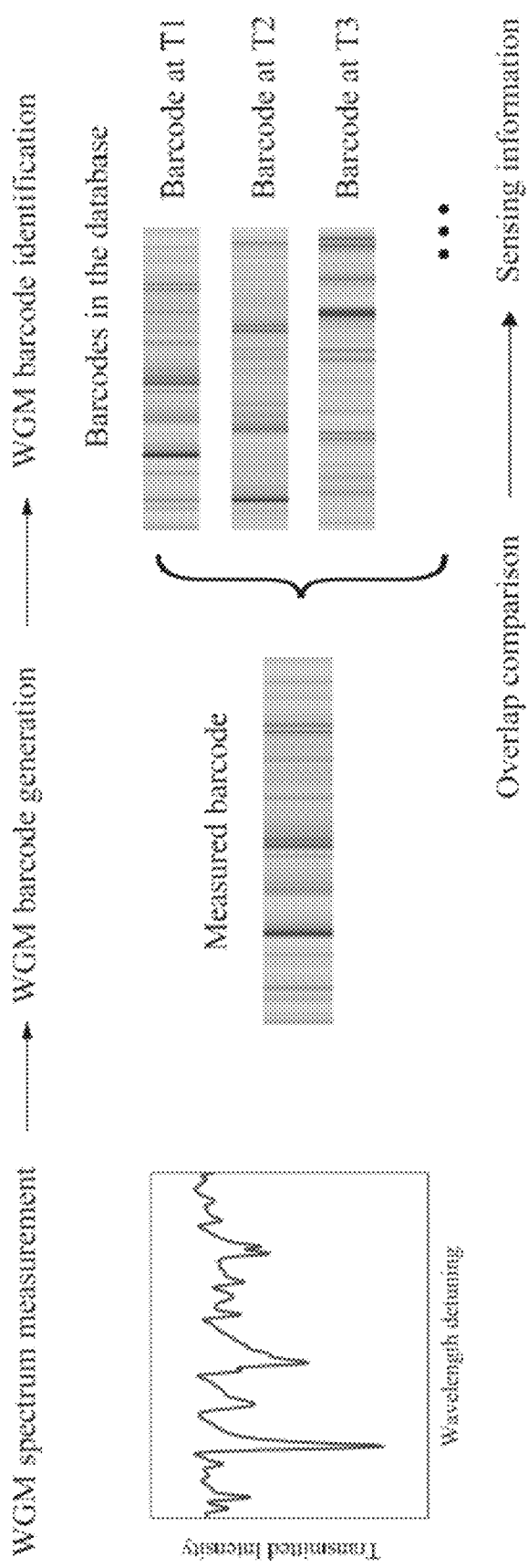
FIG. 6C is a schematic diagram illustrating the workflow of sensing temperature using the system of FIG. 5B with optical barcodes. During temperature measurement, the WGM transmission spectrum is measured and transformed into an optical barcode. By comparing the pattern of the measured barcode with the barcodes in the database, the sensing information can be extracted directly.

Using the WGM barcode technique described above, the actual temperature can be directly obtained from the multimode spectrum. The sensing process was demonstrated by measuring the spectrum at particular temperatures. As shown in FIG. 6C, a barcode was generated from the measured spectrum. By comparing its pattern with the standard patterns in the database, the measured barcode best matched the standard barcode at 30° C. with a small deviation (shift) of 1.367 pm. Using a sensitivity of 4.5 pm/° C., the actual temperature was calculated to be approximately 30.304° C., which was further confirmed by the readout of a surface resistance temperature detector of 30.3° C. In this way, the actual temperature was directly measured based on the multimode spectrum, and this measurement was not limited to the scanning range of the laser. The generated barcode also provided an instinctive method for data visualization. It was evident that the measured temperature in FIG. 6C should be close to 30° C. or 31° C., rather than 34° C., based on their pattern similarities.

To ensure that WGM spectra with rich spectral features may be obtained across the free spectral range (FSR) of the MBR, the spectrum of the MBR (FSR ~0.14 nm) was measured over a wavelength range of 1 nm, and the number of modes was determined to be 305. Based on this measurement, the average spacing between any two modes was approximately 3.3 pm, and the average number of modes within the laser scanning range (40.56 pm) was 12. Therefore, multiple modes would always be observed in the WGM spectrum at a wide temperature range. This high modal density of the MBR made it a suitable platform for sensing based on the multimode spectrum.

Reliability and Sensitivity

Figure 7A:
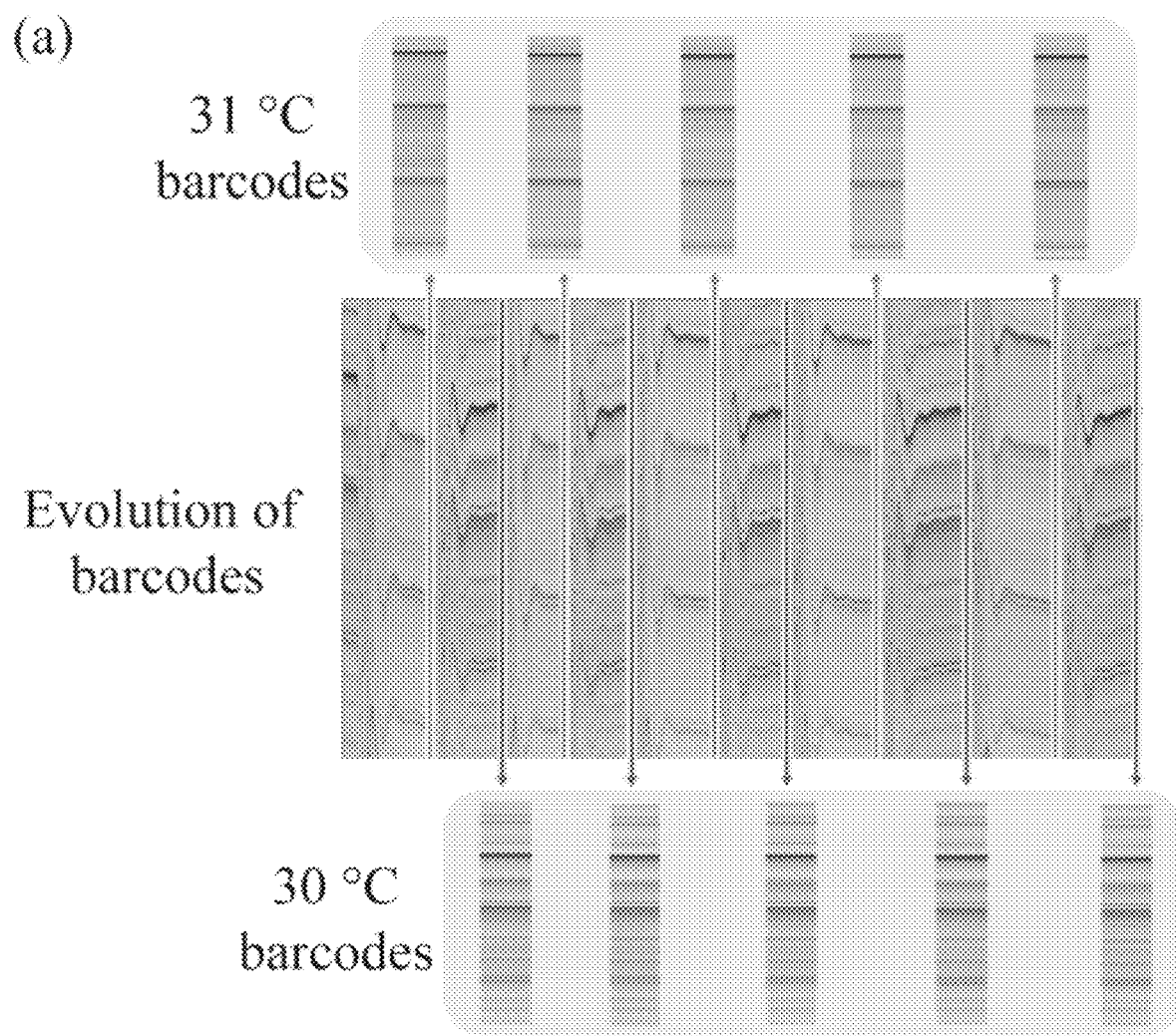
FIG. 7A contains a series of maps illustrating an evolution of optical barcodes between 30° C. and 31° C. for 5 heating and cooling cycles obtained using the WGM sensing system of FIG. 5D.

The optical WGM barcode technique relied on a one-to-one mapping between the pattern of the spectrum and the temperature, so the repeatability of patterns at the same temperature was critical. The local temperature was switched between 30° C. and 31° C. for multiple cycles and the patterns of WGM barcodes were compared at the corresponding temperatures from each cycle. In each cycle, as the temperature was switched, the proportional-integral-derivative PID) controller compared the current temperature and the temperature setpoint and calculated the desired actuator output for the heater. This process was repeated continuously, and the temperature gradually reached the set point. As shown in FIG. 7A, there was little difference between the barcodes obtained at the same temperatures. Although some of the barcodes at 31° C. seemed blurry (increased linewidth), the algorithm of the cross-correlation described herein obtained a standard deviation of 0.229 pm and a maximum difference of 0.595 pm (corresponding to a temperature difference of ~0.132° C.), which was around the level of the temperature stability of the PID thermal control (~0.1° C.). This difference may be attributable to the small temperature deviation beyond the accuracy of the thermal control. Based on this information, the measured temperature in FIG. 6C was 30.304±0.132° C.

Figure 7B:
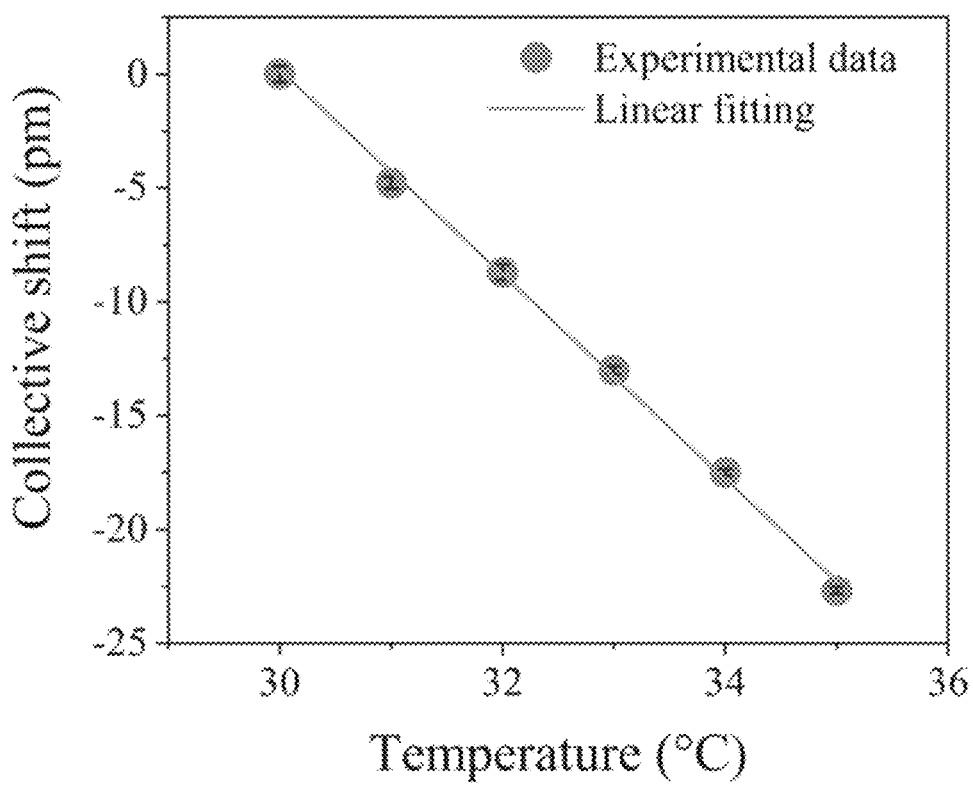
FIG. 7B is a graph summarizing the linear dependence of the collective WGM shift obtained using the WGM sensing system of FIG. 5D on the temperature, where the red balls denote experimental measurements and the blue curve is a linear fit of the experimental results.

To determine the sensitivity of the sensor described above, the local temperature was maintained at different values (30° C. to 35° C. in 5 steps) for 150 s. The collective shift was derived from the cross-correlation function. As shown in FIG. 7B, a total shift of 22.677 pm induced by the 5.0° C. temperature change was observed. The calculated sensitivity obtained from the linear fitting was 4.5 pm/° C. For packaged WGM thermal sensors, the sensitivity may be modified by the composition of the packaging material. In these experiments, the overall spectrum experienced a blueshift with increasing temperature due to the opposite signs of the thermo-optical coefficients of UV glue (negative) and silica materials (positive).

In addition, for the same sensor, different modes exhibited various sensitivities due to the different modal distributions. In conventional single-mode WGM thermal sensors, the sensing strategy is to find and track the mode with high sensitivity, which requires laborious work during calibration, and the same mode may not be identified every time. In contrast, in the WGM barcode measurement that measures the overall shift of a multimode spectrum, the sensitivity does not rely on the sensitivity of specific modes; instead, it depends on the average shift of all the modal features. The collective blueshift of the spectrum implies that most of the WGMs are affected by the UV glue with a negative thermo-optical coefficient.

High Resolution and Large Dynamic Range

Figure 7C:
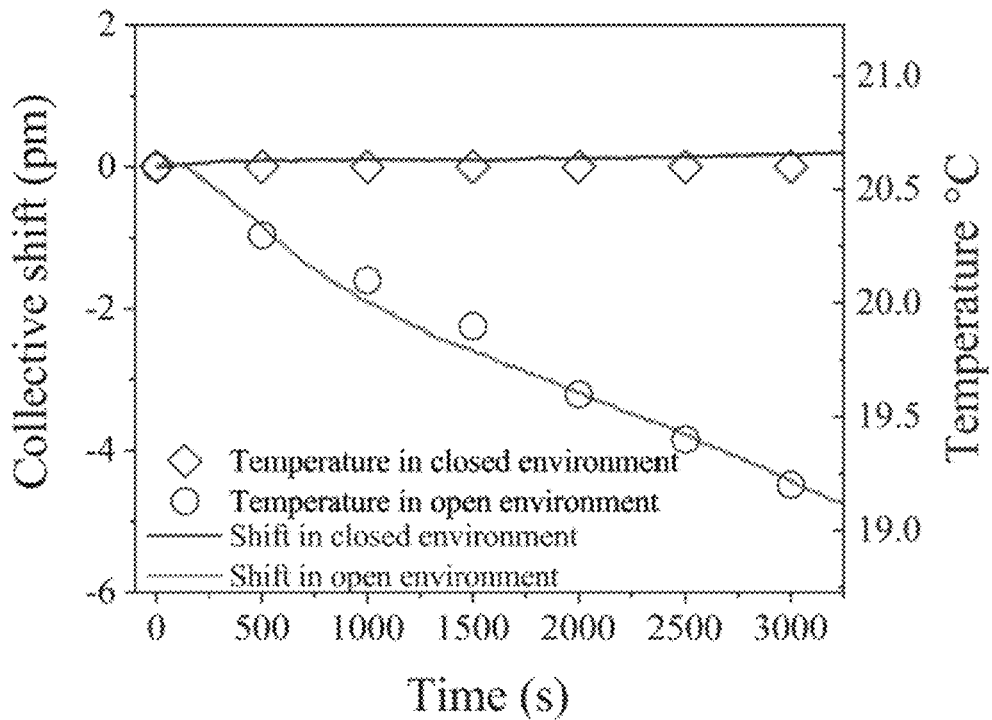
FIG. 7C is a graph summarizing the detection of temperature drift of the WGM sensing system of FIG. 5D. The red curve denotes the small collective shift induced by temperature fluctuations when the sensor is placed in a thermally isolated environment. The blue squares are the temperatures measured by a thermometer. The green curve denotes the relatively large shift when the sensor is placed in an open environment, and the blue circles are the measured temperatures.

The high Q-factor of the WGM sensor contributed to the high resolution in sensing. To show the capability of resolving small temperature changes, the collective shift was measured when the sensor is placed in a thermally isolated environment and an open environment. A resistance thermometer with a detection resolution of 0.1° C. is mounted along with the WGM sensor for comparison. As shown in FIG. 7C, in an open environment, the temperature decreased by approximately 1.4° C., and the measured collective shift matched well with the result from the resistance thermometer. In a temperature-maintaining environment, the WGM barcode sensor still detected temperature fluctuations as small as 0.04° C. over 3000 s, which was beyond the detection limit of the resistance thermometer. The linewidth of the high-Q mode used in these experiments was approximately 0.070 pm. Assuming that the smallest resolvable change in the resonance is 1/10 of the linewidth, the detection limit can reach as low as 0.002° C. With better resolution and the capability for real-time monitoring, the optical barcode sensor demonstrated great advantages in detecting extremely small temperature changes.

Figure 7D:
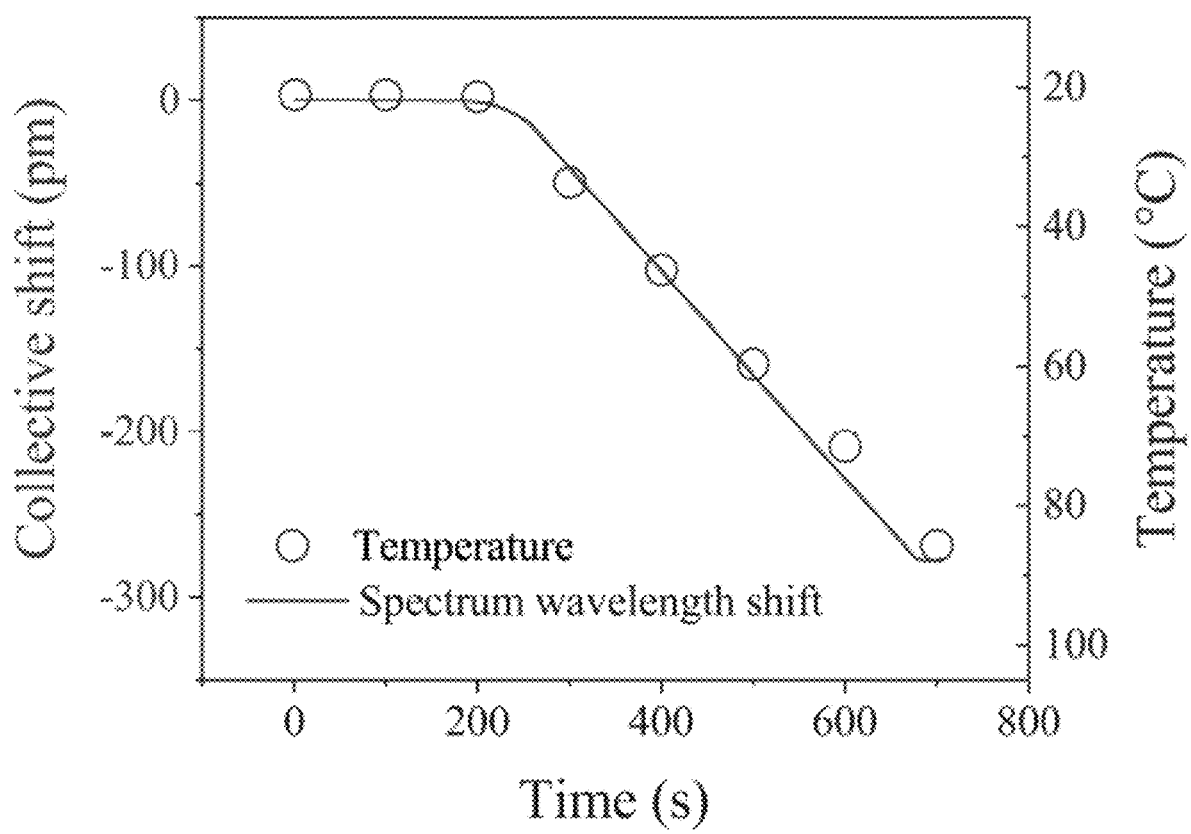
FIG. 7D is a graph summarizing the large dynamic range of the measurements obtained using the WGM sensing system of FIG. 5D. The red curve denotes the collective shift in response to a large temperature change. The blue circles are the recorded temperatures.

To explore the large dynamic range of the sensor described above, the sensor was placed in water on a hot plate to heat the water. Blueshifts were observed in the WGM spectrum with increasing temperature. The WGM collective shift, as well as the temperature change, is shown in FIG. 7D. The temperature difference was large (~65° C.), and the overall WGM spectrum shift (~275 pm) was much larger than the laser scanning range of ~40.56 pm, which was determined by the maximum modulation voltage applied to the laser.

The results of these experiments demonstrated that the WGM barcode sensing technique provided an effective way to track the collective shift of the spectrum. With this method, the dynamic range was no longer limited by the scanning range of the laser, which significantly enhanced the dynamic range of the measurement. Ultimately, the dynamic range may be limited by the materials of the sensor structure that may influence the temperature change the sensor can sustain. As long as the sensor does not suffer from irreversible damage and provides multimode spectra, the barcode technique may be implemented for temperature sensing.

Figure 7E:
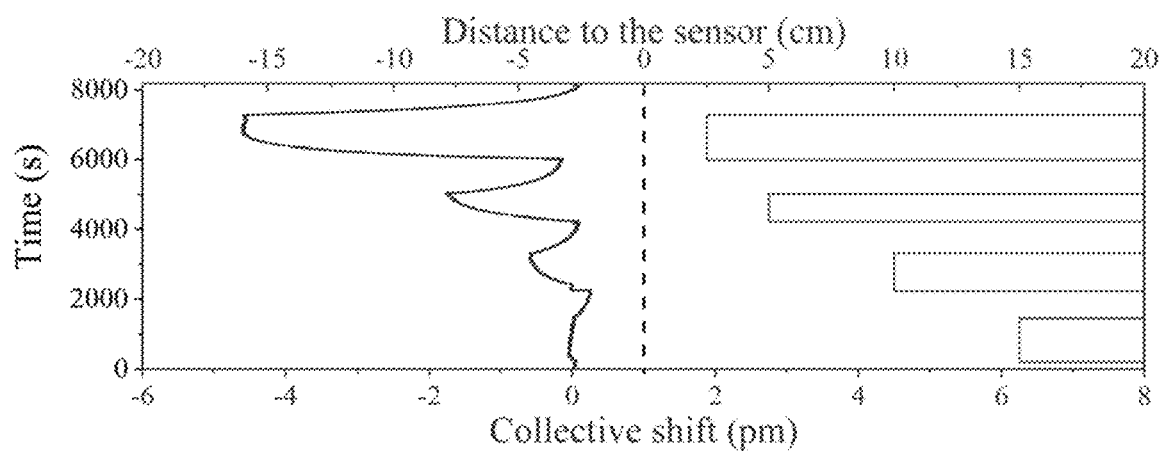
FIG. 7E is a graph summarizing the temperature sensing of a warm object (45° C.) at different distances using the WGM sensing system of FIG. 5D. Blue curve: collective shift as the object is placed at various distances. Grey line: position of the object with respect to the sensor surface marked by the dashed line at 0.

To further explore the sensing performance of our sensor, the response of the WGM sensor disclosed above was characterized during exposure to a heating source at different distances. A small heating element with a size of 18.0 mm×18.0 mm was heated to ~45° C. The heating element's temperature was monitored and maintained during all measurements. The heating element is initially positioned at a distance of 15 cm from the sensor for ~1000 s and was then moved away from the WGM sensor. This test was repeated at initial distances of 10, 5, and 2.5 cm. As shown in FIG. 7E, the sensor was able to detect small warm objects (approximately the size of a finger or a small insect) at distances of at least 15 cm.

Example 3—Real-Time Monitoring of Droplet Evaporation Using Temperature-Dependent Whisper-Gallery Mode Spectra in Microbubble Resonators To demonstrate the capabilities of the multimode spectral WGM sensor disclosed above, the following experiments were conducted. The WGM sensor was used to monitor temperature during the evaporation of droplets of different compositions.

With the small footprint, high resolution, large dynamic range, and the ability for real-time measurement, the WGM barcode sensor was demonstrated in Example 2 to be a powerful platform to study transient thermal dynamics. To further demonstrate this, the WGM barcode sensor was used to measure the temperature dynamics induced by spontaneous evaporation of small liquid droplets on a substrate.

Figure 8A:
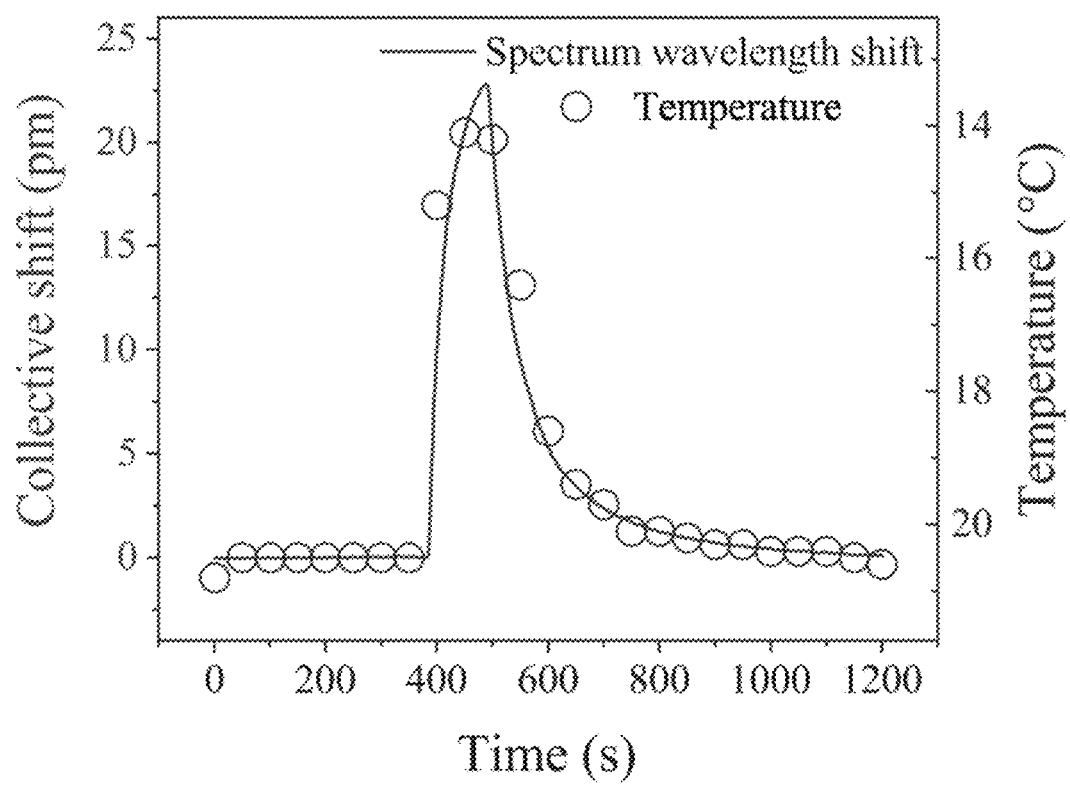
FIG. 8A is a graph summarizing the transient temperature dynamics of a sensing surface as an acetone droplet of 5 µL is positioned on the sensing surface. Red curve: collective shift of the spectrum. Blue circles: measured temperature.
Figure 8B:
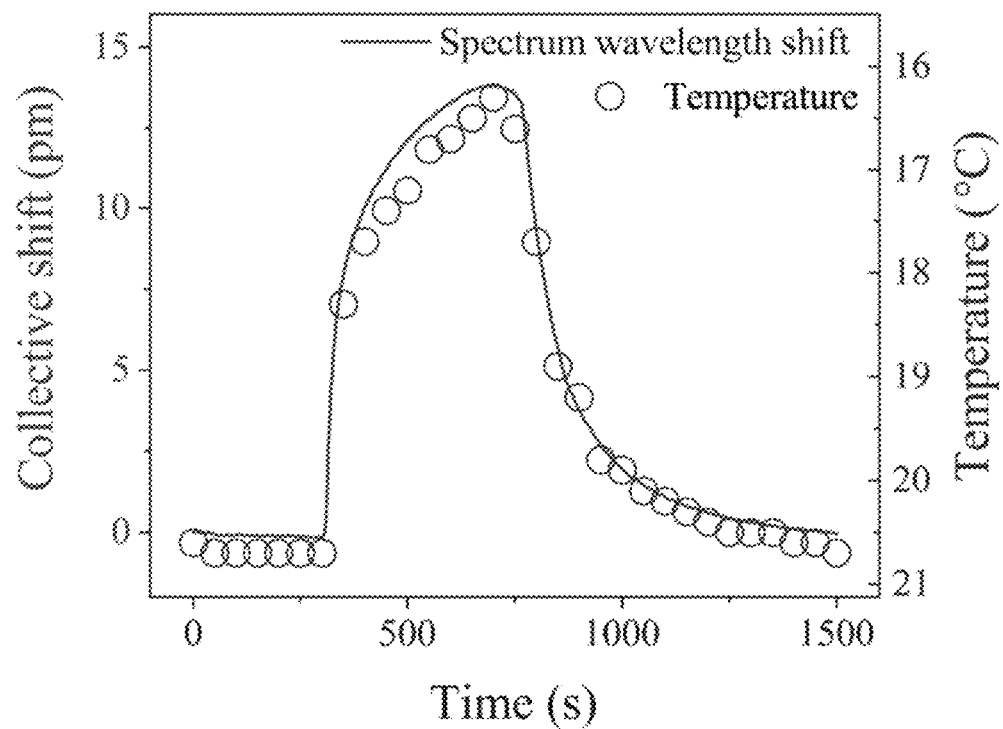
FIG. 8B is a graph summarizing the transient temperature dynamics as an ethanol droplet of 5 µL is positioned on the sensing surface. Red curve: collective shift of the spectrum. Blue circles: measured temperature.

An acetone droplet of 5 microlitres was placed on the surface of the packaged sensor (the MBR was approximately 200 pm below the surface) with a pipette and the transmission spectra of the MBR were recorded throughout the evaporation process. The change in temperature was also measured during the evaporation process by a resistance thermometer. FIGS. 8A and 8B show the dynamics of the collective shifts in transmission spectra as well as the temperature changes obtained during the spontaneous evaporation of acetone (FIG. 8A) and ethanol droplets. The temperature of the substrate dropped immediately when the droplet touched the surface, leading to a redshift of the WGM spectrum. The temperature drop rate decreased as the droplet evaporated. Finally, the temperature and collective shift returned to initial levels once the droplets were completely evaporated. These transient thermal dynamics were related to the intrinsic thermal properties of the liquid, such as the evaporation rate, thermal conductivity, and molar-specific heat capacity. Consequently, the sensorgrams of FIGS. 8A and 8B showed distinctive temperature dynamics during evaporation. Acetone has a larger evaporation rate than ethanol, so the thermal response changed faster than that of ethanol.

Figure 8C:
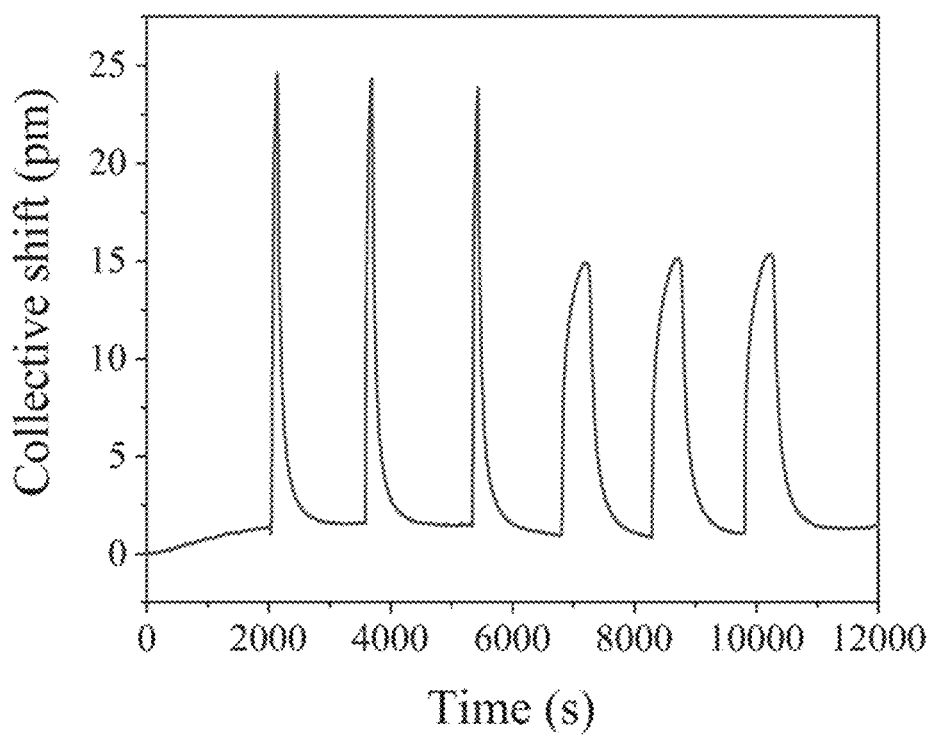
FIG. 8C is a graph summarizing transient temperature dynamics of droplet evaporation for a series of acetone and ethanol droplets on a sensing surface. The first three peaks are the response for 5 µL acetone droplets, and the last three peaks are the response for 5 µL ethanol droplets.

To ensure reliability, the spontaneous evaporation of droplets was measured during the placement and evaporation of repeated droplets. As shown in FIG. 8C, the first three peaks in the sensorgram were responses for acetone droplets, and the last three peaks were responses for ethanol droplets. There was little variation between the response patterns for the same composition of droplet. All droplet evaporations exhibited similar response curves, similar maximum shifts, and similar durations.

Although the mass of the droplet could also cause changes in the spectrum, the collective shift induced by changes in droplet mass was negligible. To estimate the collective shift induced by the mass change of the droplet during evaporation, a cured UV glue droplet was used to replace the liquid droplet. The weight of this UV glue droplet was 7.3 mg, which was relatively matched to the weights of the liquid droplets used in thermal sensing (the densities of ethanol and acetone are 789 $kg \cdot m^{-3}$ and 784 $kg \cdot m^{-3}$. The weights of 8-µL ethanol and acetone droplets were 6.312 mg and 6.272 mg. The solid UV glue was dropped on the sensor surface and then moved away from the surface. The collective shift induced by the dropping of the UV glue was ~0.015 pm (data not presented), much smaller than the shift induced by the temperature change during droplet evaporation.

Figure 8D:
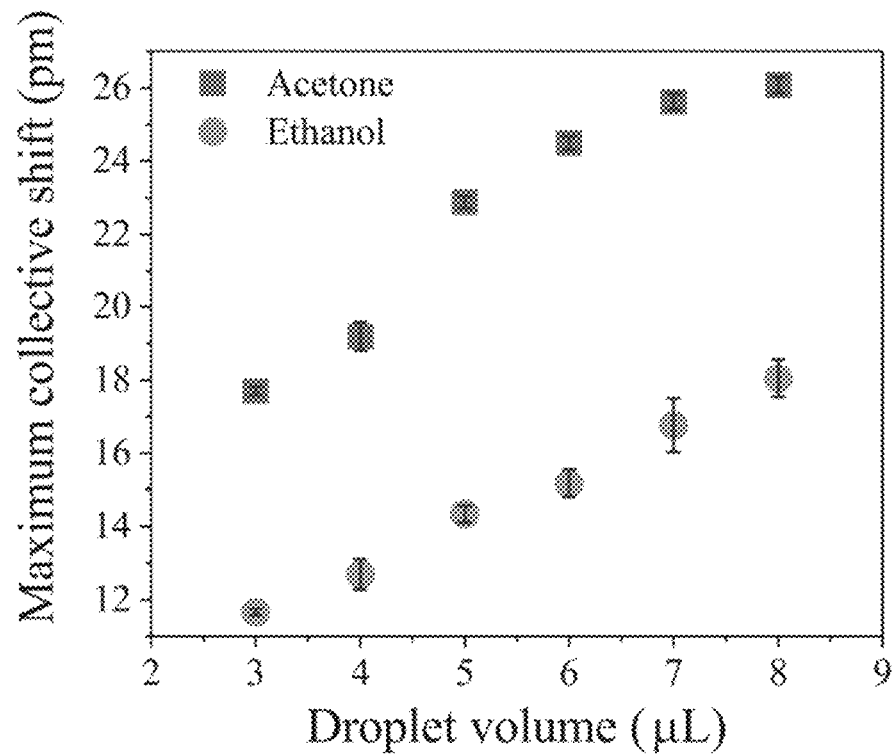
FIG. 8D is a graph summarizing the maximum collective spectral shifts in response to the evaporation of acetone and ethanol droplets of various volumes (3 µL to 8 µL in 5 steps repeated 3 times). Larger volume droplets consumed more heat from the surroundings and exhibited larger temperature changes (maximum shift). For the same droplet volume, acetone droplets caused a larger temperature change than ethanol droplets during evaporation.
Figure 9A:
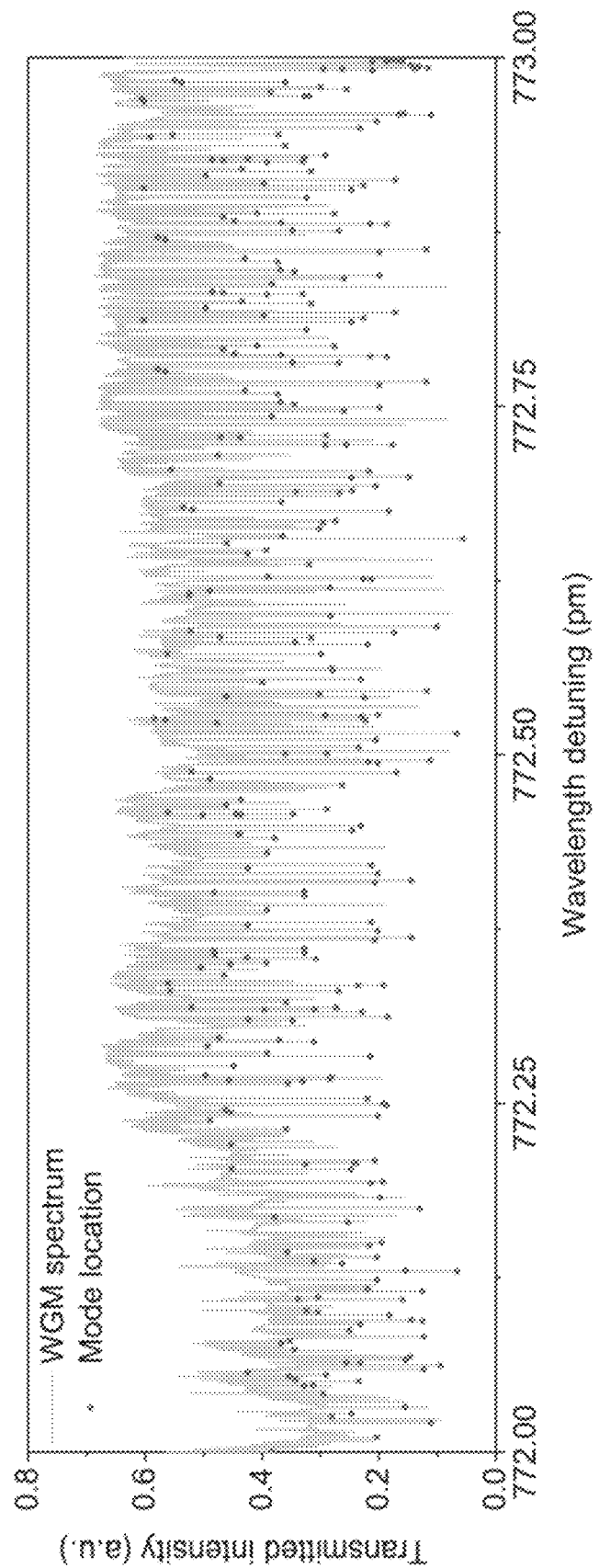
FIG. 9A is a graph summarizing the WGM transmission spectrum of the MBR for wavelengths ranging from 772 nm to 773 nm. The red dots indicate the prominent resonant modes in the spectrum.
Figure 9B:
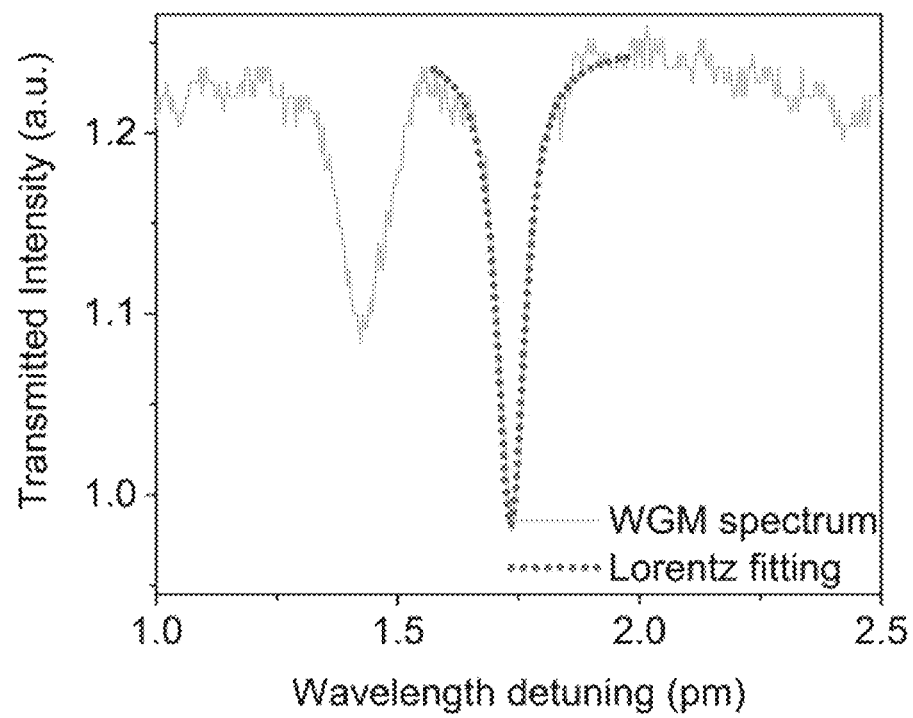
FIG. 9B is a graph summarizing an exemplary WGM spectrum of the MBR used in the measurement. The red dotted line is the Lorentz fitting to a high-Q mode.
Figure 9C:
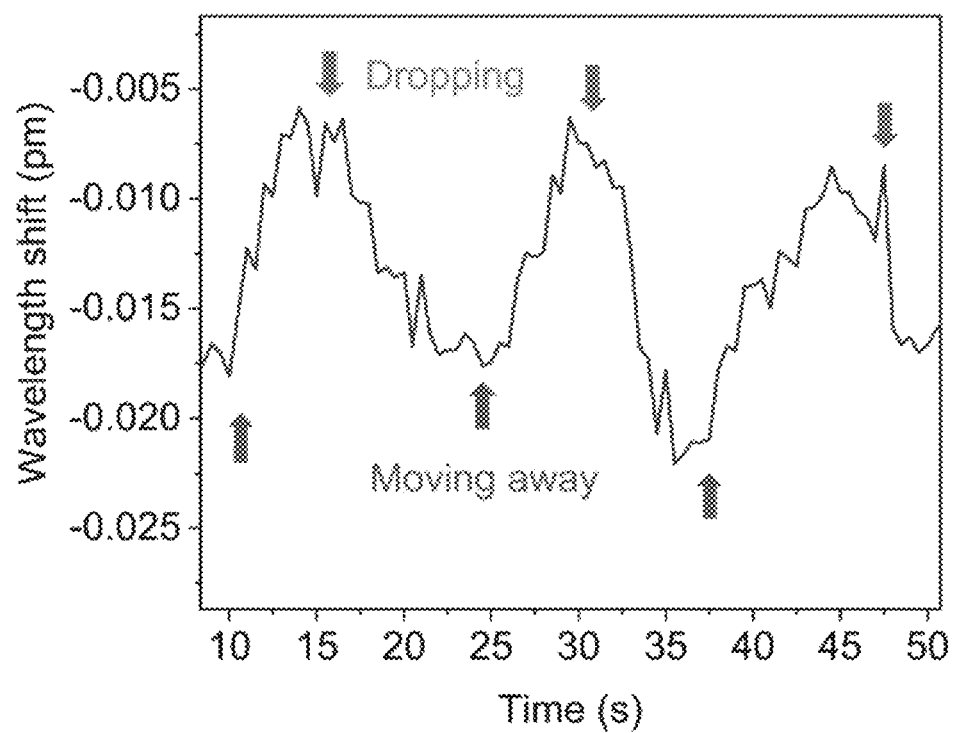
FIG. 9C is a graph summarizing the collective shift induced by dropping and moving away a small cured UV glue droplet.

The maximum collective shift reflected the maximum temperature change during droplet evaporation. Temperature dynamics were measured as described above for droplets of different volumes (3 µL to 8 µL in 5 steps); the temperature dynamics for each droplet volume were repeated three times. The maximum collective shifts for all droplet volumes are summarized in FIG. 8D. Larger droplet volumes consumed more heat from the surroundings and exhibited larger temperature changes during evaporation relative to smaller droplet volumes. Additionally, for the same droplet volume, acetone caused larger temperature changes than ethanol droplets of matched volume during evaporation.

Based on their distinctive behaviors in the evaporation-induced transient temperature fluctuations, more information may be obtained on the dynamics in droplet evaporation. The results of these experiments demonstrated the potential of the WGM barcode sensor as a high-performance sensing platform to study the evaporation and other transient thermal dynamics of liquids or microstructures.

Example 4—Characterization of Spectral Density and Resolution of Whisper-Gallery Mode Spectra in Microbubble Resonators To characterize the spectral density and resolution of the multimode spectral of the WGM sensor disclosed above, the following experiments were conducted.

Using the WGM optical sensing system described in Example 2, the laser wavelength was scanned over a range of 1 nm (772 nm to 773 nm) to obtain a dense mode spectrum. The selected scanning range was much larger than the free spectral range (FSR) of the MBR (~0.14 nm) of the system. To avoid false alarms from noises in finding mode locations, the spectrum was smoothed with a span of 5 (the number of data points for calculating the smoothed value). Prominent resonant dips in the spectrum were automatically detected using the "findpeaks" function in MATLAB with a threshold of 0.004. The resulting number of prominent modes was determined to be 305. Given the 1 nm range that was scanned, the average spacing between modes was around 3.3 pm. This average mode spacing is much smaller than the fine scanning range typically used in optical sensing (40.56 pm), which is limited by the modulation voltage applied to the laser. Consequently, on average there may be about 12 modes appearing in the spectrum within this fine scanning range. The results of this experiment confirmed that the high modal density of the MBR makes it a suitable platform for optical sensing based on the multimode spectrum.

To estimate the resolution of the multimode spectrum, the linewidth of the WGM in the transmission spectrum was measured by Lorentz fitting. The linewidth of the high-Q mode was determined to be around 0.070 pm. Assuming that about 1/10 of this linewidth may be resolved, the detection limit of the WGM optical sensing system may reach as low as 0.002° C. Wavelength detuning between two data points in the above measurements was 0.00405 pm. Ideally, the correlation calculation may be capable of resolving such a small difference. However, considering that there may be larger noises associated with real-world applications, it may be more practical to resolve 1/10 linewidth.

What is claimed is:

1. An optical thermal sensing system for measuring a temperature, the system comprising:
    a. a WGM sensor comprising a WGM resonator operatively coupled to a tunable laser source and a detector;
    b. a computing device comprising at least one processor and a non-volatile computer-readable memory, the computing device configured to:
        i. receive a plurality of signals from the detector indicative of a transmission spectrum of the WGM resonator;
        ii. transform the plurality of signals into a measured barcode, the measured barcode comprising a matrix of values indicative of at least one characteristic of the transmission spectrum; and
        iii. transform the measured barcode into the temperature based on a relative collective shift of the measured barcode from a reference barcode selected from a predetermined library of reference barcodes, each reference barcode comprising a matrix of reference values corresponding to one reference temperature.

2. The system of claim 1, wherein the WGM sensor further comprises a taper fiber waveguide with opposed first and second ends operatively coupled to the tunable laser source and the detector, respectively, wherein the taper fiber waveguide is configured to couple light into and out of the WGM resonator.

3. The system of claim 2, wherein the WGM resonator and the taper fiber are encapsulated in a low refractive index adhesive.

4. The system of claim 1, wherein the WGM resonator supports a plurality of non-degenerate whispering gallery mode resonance modes.

5. The system of claim 1, wherein the WGM resonator is a microbubble resonator.

6. The system of claim 1, wherein the detector comprises:
    a. a photodetector coupled to the second end of the tapered fiber and configured to receive transmitted light energy; and
    b. an oscilloscope configured to transform a plurality of detector signals from the photodetector into the transmission spectrum.

7. A computer-aided method of measuring a temperature using an optical thermal sensing system, the method comprising:
    a. providing an optical thermal sensing system comprising:
        i. a WGM sensor comprising a WGM resonator operatively coupled to a tunable laser source and a detector; and
        ii. a computing device comprising at least one processor and a non-volatile computer-readable memory, the computing device operatively coupled to the detector;
    b. producing a wavelength scan of laser light using the tunable laser source and directing the laser light into the first end of the taper fiber waveguide;
    c. receiving, using the detector, a transmission spectrum from the second end of the taper fiber waveguide, the transmission spectrum comprising a non-resonant portion of the wavelength scan, the non-resonant portion of the wavelength scan comprising light wavelengths falling outside of at least one resonance mode of the WGM resonator;
    d. transforming, using the computing device, the transmission spectrum into a measured barcode, the measured barcode comprising a matrix of values indicative of at least one characteristic of the transmission spectrum; and
    e. transforming, using the computing device, the measured barcode into the temperature based on a relative collective shift of the measured barcode from a reference barcode selected from a predetermined library of reference barcodes, each reference barcode comprising a matrix of reference values corresponding to one reference temperature.

8. The method of claim 7, wherein each value of the matrix of values indicative of at least one characteristic of the transmission spectrum in the measured and reference barcodes comprises one of: a resonant wavelength, a mode spacing, a coupling depth, and a linewidth.

9. The method of claim 7, wherein the matrix of values indicative of at least one characteristic of the transmission spectrum in the measured and reference barcodes comprises a one-dimensional array, each element of the one-dimensional array corresponding to a rectangle of the barcode, each rectangle indicative of one mode of the transmission spectrum, each rectangle comprising a width indicative of the linewidth of one mode of the transmission spectrum and a color indicative of a coupling depth of the one mode.

10. The method of claim 7, wherein transforming the transmission spectrum into the measured barcode comprises assigning a color to each rectangle of the barcode using a color map.

11. The method of claim 10, wherein the color map is a Parula color map.

12. The method of claim 7, wherein transforming the measured barcode into the temperature based on the relative collective shift of the measured barcode from a reference barcode selected from a predetermined library of reference barcodes further comprises:
    a. comparing, using the computing device, the measured barcode to each reference barcode from the predetermined library and selecting a most similar reference barcode;
    b. calculating, using the computing device, the relative collective shift of the measured barcode from the most similar reference barcode; and
    c. calculating, using the computing device, the temperature by adjusting the reference temperature of the most similar reference barcode in proportion to the relative collective shift.

13. The method of claim 7, wherein comparing the measured barcode to each reference barcode and selecting a most similar reference barcode further comprises calculating, using the computing device, a cross-correlation function for the measured barcode and each reference barcode and selecting the reference barcode with the lowest relative collective shift.

14. The method of claim 7, wherein adjusting the reference temperature of the most similar reference barcode in proportion to the relative collective shift further comprises calculating, using the computing device, a temperature change relative to the selected reference barcode by converting the relative collective shift to a temperature shift relative to the corresponding temperature of the selected reference barcode using an empirically-derived relationship.

15. The method of claim 7, further comprising creating a library of reference barcodes by:

a. obtaining a reference barcode for each known reference temperature by:

i. producing a wavelength scan of laser light using the tunable laser source and directing the laser light into the first end of the taper fiber waveguide;

ii. receiving, using the detector, a transmission spectrum from the second end of the taper fiber waveguide, the transmission spectrum comprising a non-resonant portion of the wavelength scan, the non-resonant portion of the wavelength scan comprising light wavelengths falling outside of at least one resonance mode of the WGM resonator; and iii. transforming, using the computing device, the transmission spectrum into a measured barcode, the measured barcode comprising a matrix of values indicative of at least one characteristic of the transmission spectrum at the known reference temperature; and b. combine, using the computing device, each reference barcode at each known reference temperature to create the library of reference barcodes.

\* \* \* \* \*